(12) United States Patent
Jerg et al.

(10) Patent No.: US 10,188,264 B2
(45) Date of Patent: Jan. 29, 2019

(54) DISHWASHER COMPRISING A SORPTION DRYING DEVICE

(71) Applicant: BSH Hausgeräte GmbH, Munich (DE)

(72) Inventors: Helmut Jerg, Giengen (DE); Kai Paintner, Welden (DE)

(73) Assignee: BSH Hausgeräte GmbH, Munich (DE)

( * ) Notice: Subject to any disclaimer, the term of this patent is extended or adjusted under 35 U.S.C. 154(b) by 77 days.

(21) Appl. No.: 15/435,327

(22) Filed: Feb. 17, 2017

(65) Prior Publication Data
US 2017/0156565 A1 Jun. 8, 2017

Related U.S. Application Data

(63) Continuation of application No. 13/059,236, filed as application No. PCT/EP2009/060238 on Aug. 6, 2009.

(30) Foreign Application Priority Data

Aug. 27, 2008 (DE) ........................ 10 2008 039 894

(51) Int. Cl.
| | |
|---|---|
| A47L 15/48 | (2006.01) |
| A47L 15/42 | (2006.01) |
| B01D 53/04 | (2006.01) |
| B01D 53/26 | (2006.01) |
| B01J 20/08 | (2006.01) |

(Continued)

(52) U.S. Cl.
CPC ......... *A47L 15/481* (2013.01); *A47L 15/4291* (2013.01); *B01D 53/0438* (2013.01); *B01D 53/261* (2013.01); *B01J 20/08* (2013.01); *B01J 20/103* (2013.01); *B01J 20/18* (2013.01); *B01J 20/28004* (2013.01); *B01J 20/2808* (2013.01); *B01J 20/28019* (2013.01);
(Continued)

(58) Field of Classification Search
CPC .................................................... A47L 15/481
See application file for complete search history.

(56) References Cited

U.S. PATENT DOCUMENTS

| | | | |
|---|---|---|---|
| 4,971,611 | A | 11/1990 | Noguchi |
| 5,341,848 | A | 8/1994 | Laws |

(Continued)

FOREIGN PATENT DOCUMENTS

| | | | |
|---|---|---|---|
| CN | 201012079 Y | | 1/2008 |
| DE | 1180355 B | | 10/1964 |

(Continued)

OTHER PUBLICATIONS

Perry and Green, Perry's Chemical Engineers' Handbook, Sixth Edition, Published 1984.

(Continued)

*Primary Examiner* — Jason Y Ko
(74) *Attorney, Agent, or Firm* — Michael E. Tschupp; Andre Pallapies; Brandon G. Braun

(57) ABSTRACT

A dishwasher is provided, which has a washing container; an air-guiding channel to generate an air flow; and a sorption drying system to dry items to be washed, wherein the sorption drying system has a sorption container with reversibly dehydratable sorption material. The sorption container is connected to the washing container by the air-guiding channel. In the sorption container, a through-flow cross-sectional area for the reversibly dehydratable sorption material of substantially between 80 $cm^2$ and 800 $cm^2$ is provided.

62 Claims, 12 Drawing Sheets

(51) Int. Cl.
*B01J 20/10* (2006.01)
*B01J 20/18* (2006.01)
*B01J 20/28* (2006.01)

(52) U.S. Cl.
CPC .. *B01D 2253/104* (2013.01); *B01D 2253/106* (2013.01); *B01D 2253/108* (2013.01); *B01D 2257/80* (2013.01)

(56) References Cited

U.S. PATENT DOCUMENTS

| | | | |
|---|---|---|---|
| 5,364,455 | A | 11/1994 | Komameni et al. |
| 5,529,093 | A | 6/1996 | Gallagher et al. |
| 5,566,880 | A | 10/1996 | Khelifa et al. |
| 6,110,254 | A | 8/2000 | Johnson et al. |
| 6,434,857 | B1 | 8/2002 | Anderson et al. |
| 7,585,373 | B2 | 9/2009 | Jerg et al. |
| 8,123,869 | B2 | 2/2012 | Jerg et al. |
| 2003/0153457 | A1 | 8/2003 | Nemoto et al. |
| 2006/0278257 | A1 | 12/2006 | Jerg et al. |
| 2007/0101609 | A1 | 5/2007 | Jerg et al. |
| 2007/0214959 | A1 | 9/2007 | Remi Le Bac et al. |
| 2007/0234588 | A1 | 10/2007 | Classen et al. |
| 2007/0295360 | A1 | 12/2007 | Jerg et al. |
| 2007/0295373 | A1 | 12/2007 | Jerg et al. |
| 2008/0083433 | A1 | 4/2008 | Jerg et al. |
| 2008/0127997 | A1 | 6/2008 | Jerg et al. |
| 2010/0326480 | A1 | 12/2010 | Jerg et al. |
| 2011/0126867 | A1 | 6/2011 | Jerg et al. |
| 2011/0132412 | A1 | 6/2011 | Jerg et al. |
| 2011/0139195 | A1 | 6/2011 | Jerg et al. |
| 2011/0139198 | A1 | 6/2011 | Jerg et al. |
| 2012/0234354 | A1 | 9/2012 | Jerg et al. |

FOREIGN PATENT DOCUMENTS

| | | |
|---|---|---|
| DE | 1258839 B | 1/1968 |
| DE | 1567507 A1 | 4/1970 |
| DE | 1924398 A1 | 11/1970 |
| DE | 1955617 A1 | 4/1971 |
| DE | 3741652 A1 | 6/1986 |
| DE | 3626887 A1 | 2/1988 |
| DE | 3926597 A1 | 2/1991 |
| DE | 4304076 A1 | 8/1994 |
| DE | 1405202 A1 | 9/1994 |
| DE | 4441264 A1 | 5/1996 |
| DE | 68928556 T2 | 4/1998 |
| DE | 19917740 A1 | 10/2000 |
| DE | 10353774 A1 | 2/2005 |
| DE | 10353775 A1 | 2/2005 |
| DE | 102005004094 A1 | 6/2006 |
| DE | 102005004095 A1 | 6/2006 |
| DE | 102005004096 A1 | 6/2006 |
| EP | 0358279 A1 | 9/1989 |
| EP | 0777998 A1 | 6/1997 |
| EP | 1097669 A2 | 5/2001 |
| EP | 1674029 A1 | 6/2006 |
| EP | 1674030 A1 | 6/2006 |
| FR | 1169658 A1 | 1/1959 |
| FR | 2648484 A1 | 12/1990 |
| FR | 2649001 B1 | 10/1991 |
| GB | 1316623 | 5/1973 |
| GB | 2142128 A | 1/1985 |
| GB | 2284164 A | 5/1995 |
| WO | 0203002 A1 | 1/2002 |
| WO | 2005053502 A1 | 6/2005 |
| WO | 2005094660 A1 | 10/2005 |

OTHER PUBLICATIONS

Grace GmbH Brochure, "Molecular Sieves—Characteristics and Applications," 1979.
Rhone-Poulenc Specialities Chimiques Technical Documentation Regarding "Molecular sieve 4A, Molecular sieve 3A," Molecular sieve 5A, and "Molecular sieve 13X," 1982.
Hauer, "Evaluation of Solid Adsorbents in Open Sorption Systems for Energetic Applications," Dissertation TU Berlin, 2002.
Haefner et al., "Transient Sorption of Water Vapour from Air Flowing Through Beds of Zeolite 13X," Ind. Eng. Chem. Fundam., 1986, 25, 498-503.
Opposition and English Translation against European Patent No. EP 2 317 904 B1, issued by European Patent Office, dated Nov. 6, 2012, 27 pages.
Union Carbide brochure, "Molecular Sieves," 1979.
Report of Examination including National Search Report CN 200980133457.7.
Report of Examination including National Search Report CN 200980133141.8 dated Dec. 28, 2012.
Report of Examination including National Search Report CN 200980133458.1.

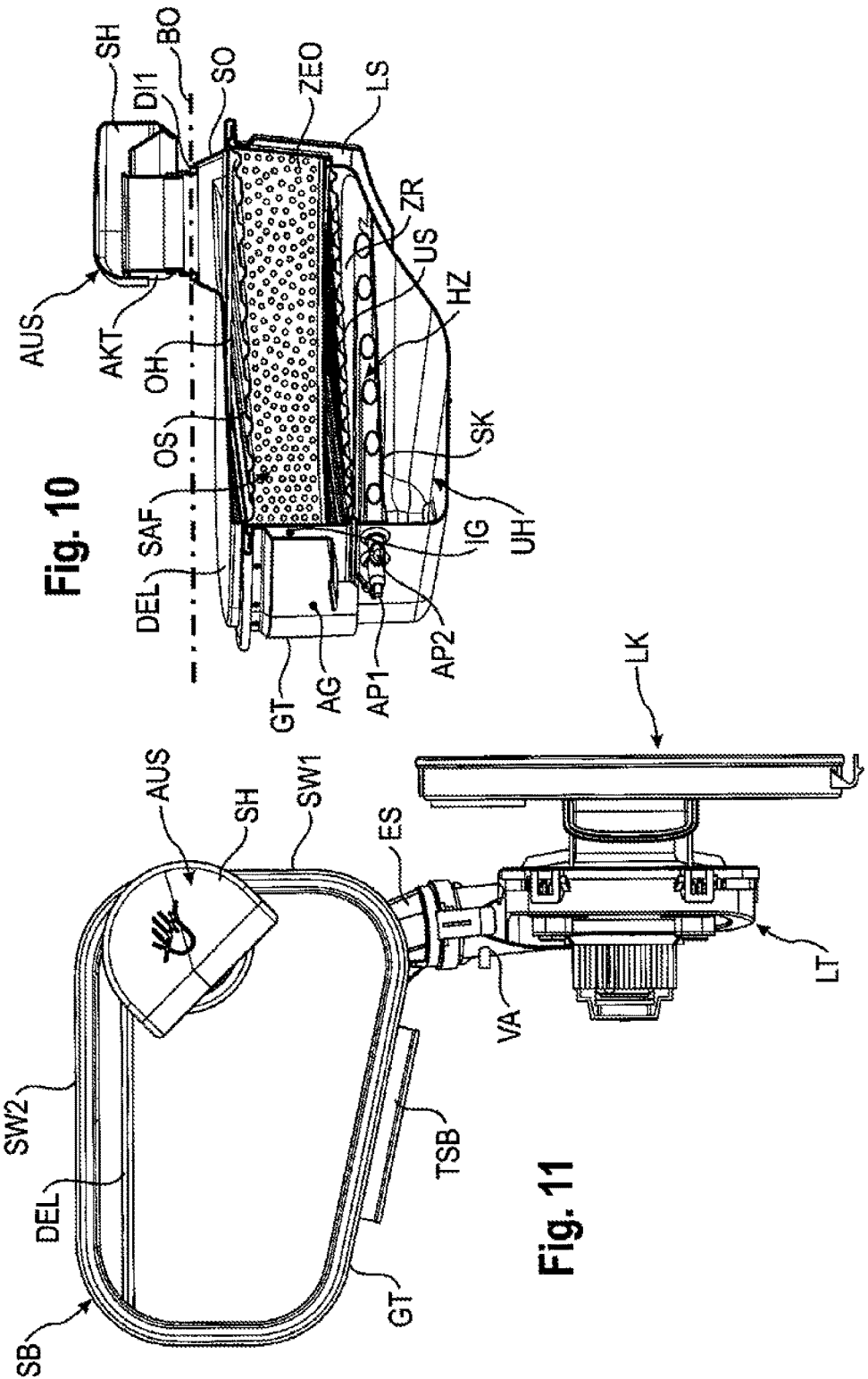

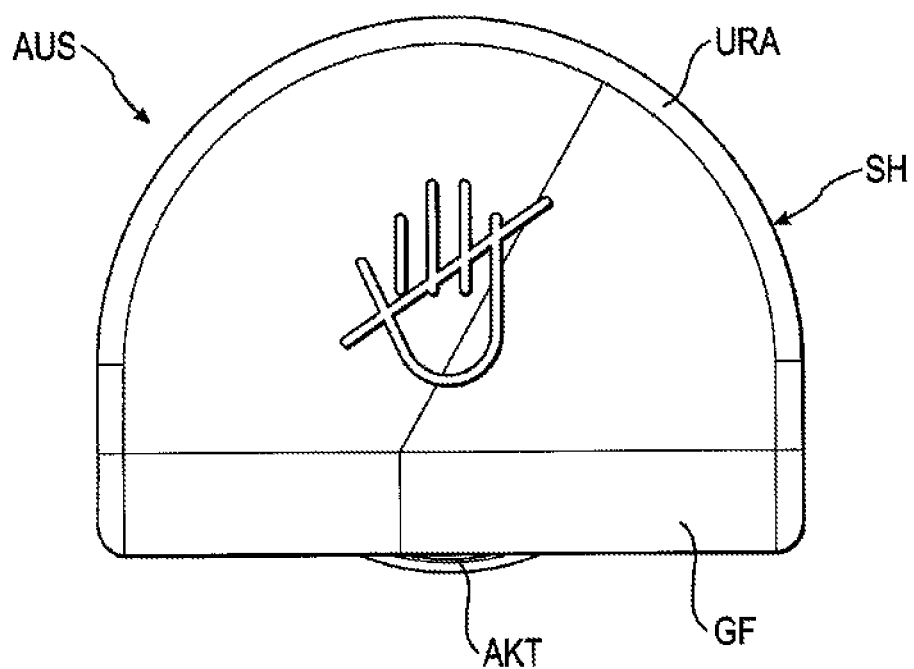

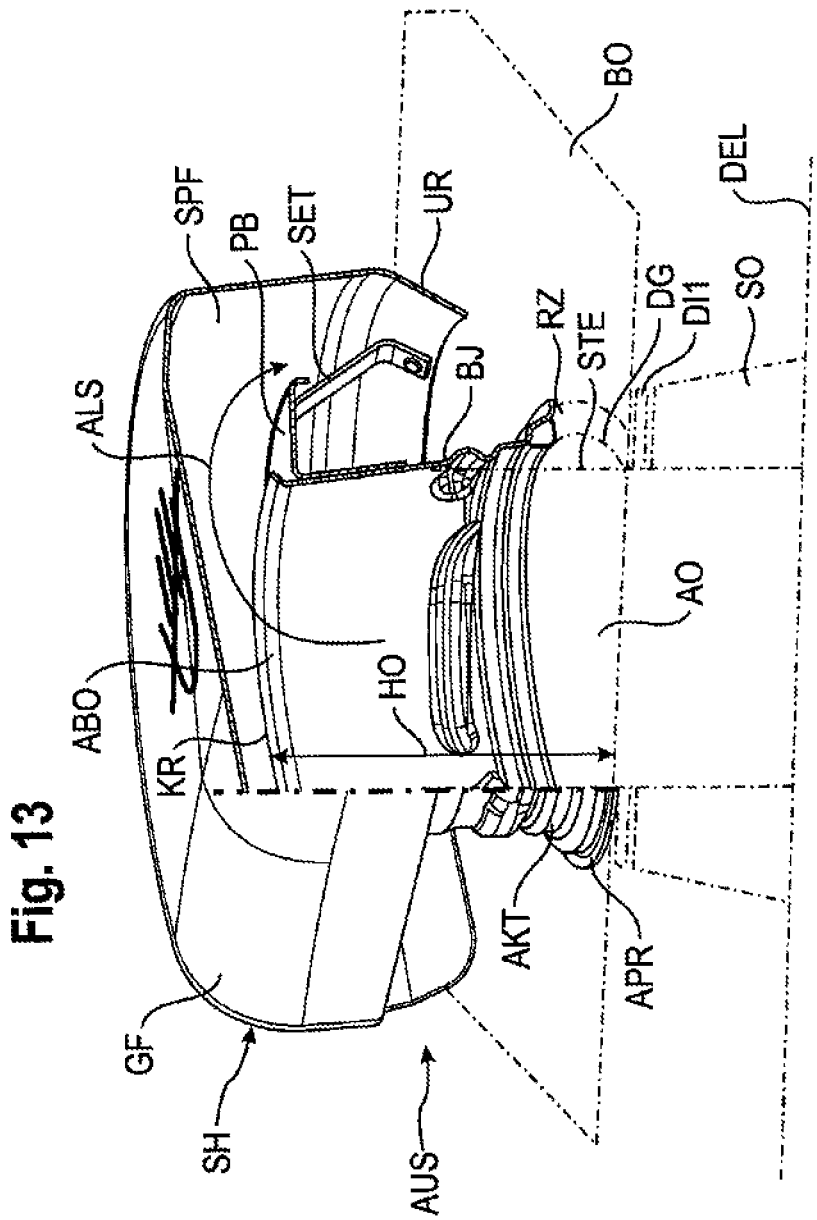

DISHWASHER COMPRISING A SORPTION DRYING DEVICE

CROSS-REFERENCE TO RELATED APPLICATIONS

This patent application is a continuation patent application of U.S. patent application Ser. No. 13/059,236, filed Feb. 16, 2011, which is a 35 U.S.C. 371 National Stage Entry of PCT/EP2009/060238, filed Aug. 6, 2009, which claims priority from German Patent Application No. 102008039894.2, filed on Aug. 27, 2008.

BACKGROUND OF THE INVENTION

The present invention relates to a dishwasher, in particular a household dishwasher, comprising at least one washing container and at least one sorption drying system for drying items to be washed, the sorption drying system having at least one sorption container comprising a reversibly dehydratable sorption material, said container being connected to the washing container by means of at least one air-guiding channel for the generation of an air flow.

Dishwashers with a so-called sorption column for drying dishes are known for example from DE 103 53 774 A1, DE 103 53 775 A1 or DE 10 2005 004 096 A1. In the "drying" subprogram step of the respective dishwashing program of the dishwasher for drying dishes, moist air is guided by means of a fan out of the washing container of the dishwasher through the sorption column and moisture is removed from the air guided therethrough by the reversibly dehydratable drying material of said sorption column through condensation. For regeneration, i.e. desorption of the sorption column, the reversibly dehydratable drying material thereof is heated to very high temperatures. Water stored in this material is thereby released as hot water vapor and is guided by an air flow generated by means of the fan into the washing container. A washing liquor and/or dishes located in the washing container, as well as the air located in the washing container can be heated by this means. A sorption column of this type has proven to be highly advantageous for the energy-saving and quiet drying of the dishes. To avoid local overheating of the sorption drying material during the desorption process, in DE 10 2005 004 096 A1, for example, a heater is arranged in the direction of flow of the air, upstream of the air inlet of the sorption column. Despite this "air heating" during desorption, it remains difficult in practice to dry the reversibly dehydratable drying material consistently adequately and thoroughly.

BRIEF SUMMARY OF THE INVENTION

The underlying object of the invention is to provide a dishwasher, in particular a household dishwasher, with a further improved sorption drying and/or desorption result for the reversibly dehydratable drying material of the sorption unit of its sorption drying device.

This object is achieved for a dishwasher, in particular a household dishwasher, of the type mentioned at the outset, by a through-flow cross-sectional area for the sorption material (ZEO) of substantially between 80 and 800 cm², in particular between 150 and 500 cm², being provided in the sorption container (SB).

This largely ensures that items to be washed in the washing container can be dried in an thorough, energy-efficient and reliable manner. It also makes it possible to accommodate the drying device in the dishwasher in a compact manner.

In particular it is largely ensured that moist air which is guided in the respective desired drying process via the air guiding channel from the washing container into the sorption container and flows through its sorption unit with the sorption material, can be dried with sorption by means of the sorption material in a thorough, reliable and energy-efficient manner Later, after this drying process, e.g. in at least one rinsing or cleaning cycle of a later newly-started dishwashing program, the sorption material can be regenerated through desorption, i.e. processed again, in a thorough, energy-efficient and material-saving manner in preparation for a subsequent drying process.

Other developments of the invention are described in the subclaims.

BRIEF DESCRIPTION OF THE DRAWINGS

The invention and its developments will be described in greater detail below with reference to drawings, in which FIG. 10 shows in schematic perspective representation the internal structure of the sorption container of FIGS. 4, 5, 9 in a partially cutaway state, FIG. 11 shows in schematic plan representation, viewed from above, the entirety of the components of the sorption drying system of FIGS. 1 to 10, FIGS. 12 to 14 show schematically in various views the outlet element of the sorption drying system of FIGS. 1 to 3 as an individual item.

DETAILED DESCRIPTION OF EXEMPLARY EMBODIMENTS OF THE PRESENT INVENTION

Figure 1:
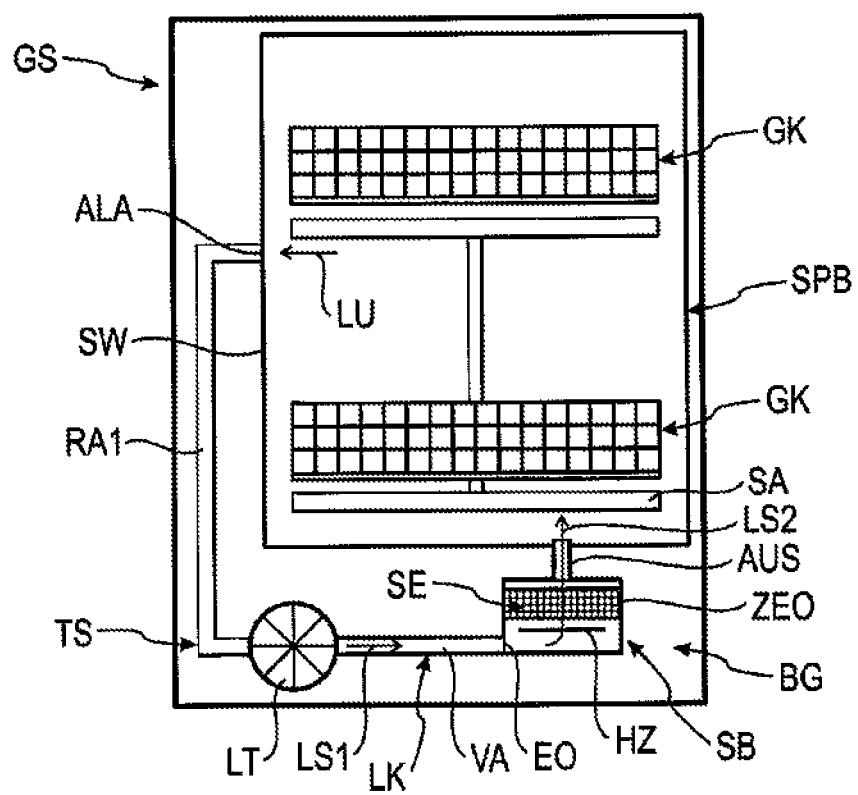
FIG. 1 shows schematically a dishwasher comprising a washing container and a sorption drying system, the components of which are embodied according to the inventive design principle.

Elements having an identical function and mode of operation are in each case labeled with the same reference characters in FIGS. 1 to 17.

FIG. 1 shows in schematic representation a dishwasher GS which comprises as its main components a washing container SPB, a base module BG arranged thereunder and a sorption drying system TS according to the inventive design principle. The sorption drying system TS is preferably provided externally, i.e. outside the washing container SPB, partly on a side wall SW and partly in the base module BG. It comprises as its main components at least one air-guiding channel LK, at least one fan unit or a blower LT inserted in said air-guiding channel and at least one sorption container SB. The washing container SPB preferably accommodates one or more mesh baskets GK for receiving and for washing items such as dishes for example. One or more spray devices such as e.g. one or more rotating spray arms SA are provided in the interior of the washing container SPB for spraying the items to be cleaned with a liquid. In the exemplary embodiment here, both a lower spray arm and an upper spray arm are suspended to allow them to rotate in the washing container SPB.

To clean items to be washed, dishwashers run through wash programs which comprise a plurality of program steps. The respective wash program may comprise in particular the following individual program steps running consecutively over time: A prewash step for removing coarse soiling, a cleaning step with the addition of detergent to fluid or water, an intermediate wash step, a rinse step with the application of liquid or water mixed with wetting agents or rinse aid, and a final drying step in which the cleaned items are dried. Depending on the cleaning step or wash cycle of a selected dishwashing program, fresh water and/or used water mixed with detergent is applied to the items to be washed in each case e.g. for a cleaning cycle, for an intermediate wash cycle and/or for a final rinse cycle.

The fan unit LT and the sorption container SB are accommodated in the exemplary embodiment here in the base module BG underneath the base BO of the washing container SPB. The air-guiding channel LK runs from an outlet opening ALA which is provided above the base BO of the washing container SPB in a side wall SW thereof, externally on this side wall SW with an inlet-end tube portion RA1 down to the fan unit LT in the base module BG. The outlet of the fan unit LT is connected by means of a connecting section VA of the air-guiding channel LK to an inlet opening EO of the sorption container SB in a region thereof close to the base. The outlet opening ALA of the washing container SPB is provided above the base BO thereof, preferably in the middle region or in the central region of the side wall SW, for sucking air out of the interior of the washing container SPB. Alternately, it is of course also possible to fix the outlet opening in the back wall RW (see FIG. 2) of the washing container SPB. Expressed in general terms, it is in particular advantageous to provide the outlet opening preferably at least above a foam level up to which foam may form in a cleaning cycle, preferably in the upper half of the washing container SPB in one of the side walls SW and/or back wall thereof. It can optionally also be useful to introduce multiple outlet openings in at least one side wall, top wall and/or the back wall of the washing container SPB and to connect these outlet openings by means of at least one air-guiding channel to one or more inlet openings in the housing of the sorption container SB before the beginning or start of the sorption material portion thereof.

The fan unit LT is preferably embodied as an axial fan. It serves to force moist hot air LU to flow out of the washing container SPB through a sorption unit SE in the sorption container SB. The sorption unit SE contains reversibly dehydratable sorption material ZEO which can absorb and store moisture from the air LU guided through it. The sorption container SB has an outflow opening AO (see FIGS. 4, 5) on the top side in the region of its housing GT close to the cover, said outflow opening being connected by means of an outlet element AUS through a through-insertion opening DG (see FIG. 13) in the base BO of the washing container SPB to the interior thereof. In this way, during a drying step of a dishwashing program for the drying of cleaned items, moist hot air LU can be sucked by means of the switched-on fan unit LT out of the interior of the washing container SPB through the outlet opening ALA into the inlet-end tube portion RA1 of the air-guiding channel LK and transported via the connecting section VA into the interior of the sorption container SB to be forced to flow through the reversibly dehydratable sorption material ZEO in the sorption unit SE. The sorption material ZEO in the sorption unit SE extracts water from the moist air flowing through it such that downstream of the sorption unit SE dried air can be blown via the outlet element or exhaust element AUS into the interior of the washing container SPB. In this way, this sorption drying system TS provides a closed air-circulation system. The spatial arrangement of the various components of this sorption drying system TS will emerge from the schematic perspective representation of FIG. 2 and the schematic side view of FIG. 3. In FIG. 3, the course of the base BO of the washing container SPB is additionally included in the drawing as a dashed and dotted line, which better illustrates the spatial/geometric proportions of the layout of the sorption drying system TS.

The outlet opening ALA is preferably arranged at a point above the base BO that enables the collection or suction of as much moist hot air LU as possible out of the upper half of the washing container SPB into the air-guiding channel LK. This is because, after the cleaning cycle, in particular final rinse cycle with heated liquid, moist hot air collects preferably above the base BO, in particular in the upper half, of the washing container SPB. The outlet opening ALA lies preferably at a vertical position above the level of foam which can occur during regular washing or in the event of a malfunction. In particular, foam can be caused e.g. by detergent in the water during the cleaning cycle. On the other hand, the position of the discharge point or outlet opening ALA will be chosen such that for the inlet-end tube portion RA1 of the air-guiding channel LK a still rising pathway on the side wall SW will be freely available. Placing the discharge opening or outlet opening in the central area, cover area and/or upper area of the side wall SW and/or back wall RW of the washing container SPB also largely prevents the possibility of water being injected out of the sump in the base of the washing container or out of the liquid spraying system thereof through the outlet opening ALA of the washing container SPB directly into the air-guiding channel LK and subsequently entering the sorption container SB, which there could otherwise render inadmissibly moist, partially damage or render unusable, or even completely destroy, the sorption material ZEO thereof.

At least one heating device HZ for desorption and thus regeneration of the sorption material ZEO is arranged in the sorption container SB upstream of the sorption unit SE thereof, viewed in the direction of flow. The heating device HZ serves to heat air LU which is driven by means of the fan unit LT through the air-guiding channel LK into the sorption container. This forcibly heated air absorbs the stored moisture, in particular water, from the sorption material ZEO as it flows through the sorption material ZEO. This water which is expelled from the sorption material ZEO is transported by the heated air via the outlet element AUS of the sorption container SB into the interior of the washing container. This desorption process preferably takes place when the heating of liquid for a cleaning cycle or other wash cycle of a subsequent dishwashing program is desired or is being carried out. In this case the air heated by the heating device HZ for the desorption process can simultaneously be included for heating the liquid in the washing container SPB, on its own or to support a conventional water heater, which is energy-saving.

Figure 2:
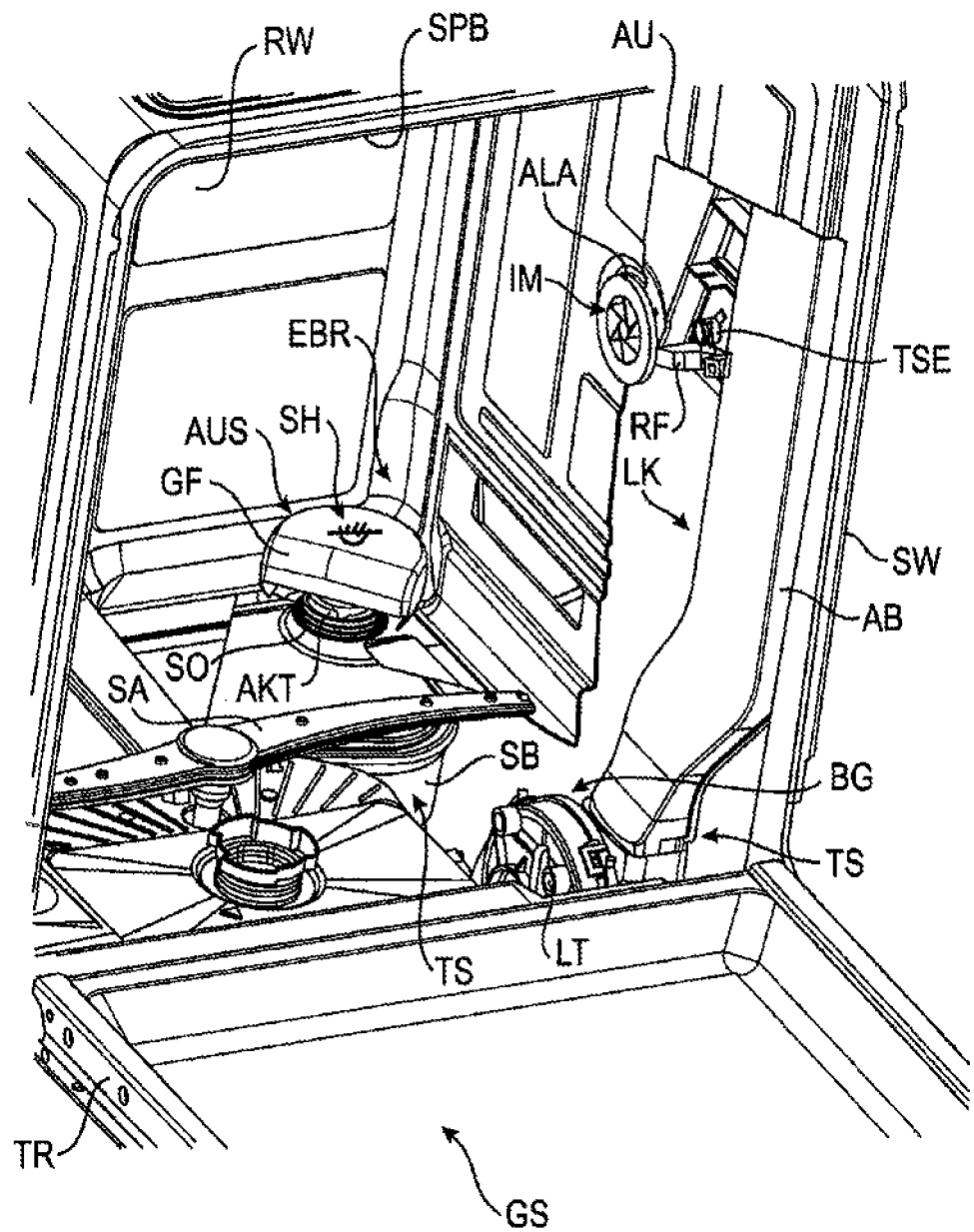
FIG. 2 shows schematically in perspective representation the open washing container of the dishwasher from FIG. 1 with components of the sorption drying system which are partially exposed, i.e. shown uncovered in the drawing.
Figure 3:
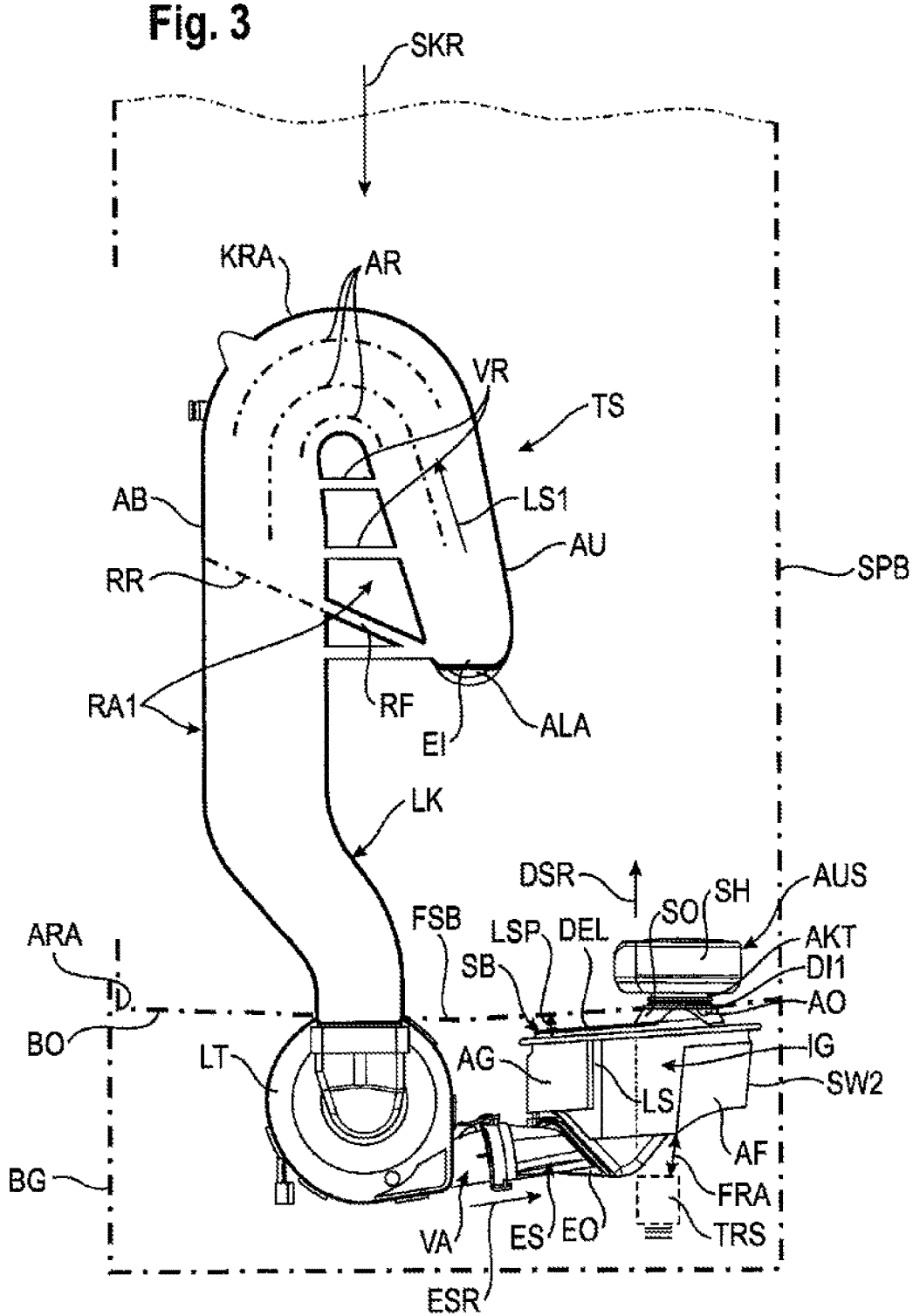
FIG. 3 shows in schematic side view the entirety of the sorption drying system from FIGS. 1, 2, the components of which are accommodated partly externally on a side wall of the washing container and partly in a base module underneath the washing container.

FIG. 2 shows, with the door TR of the dishwasher GS from FIG. 1 open, the main components of the sorption drying system TS in the side wall SW and the base module BG partially in an exposed state in a perspective representation. FIG. 3 shows, to accompany this, the totality of components of the sorption drying system TS, viewed from the side. The inlet-end tube portion RA1 of the air-guiding channel LK comprises, starting from the vertical position of its inlet opening EI at the location of the outlet opening ALA of the washing container SPB, a tube portion AU that is upwardly rising in relation to the direction of gravity and thereafter a tube portion AB that is downwardly descending in relation to the direction of gravity. The upwardly rising tube portion AU runs somewhat obliquely upward relative to the vertical direction of gravity SKR and passes into a curved portion KRA, which is convexly curved and forces, with respect to the inflowing air flow LS1, a reversal of direction of approximately 180° downward into the adjacent, substantially vertically downward descending, tube portion AB. This tube portion ends in the fan unit LT. The first upwardly rising tube portion AU, the curved portion KRA and the downstream, second, downward descending tube portion AB form in the exemplary embodiment here a flat channel having a substantially flatly rectangular cross-sectional geometric shape.

One or more flow-guiding ribs or drainage ribs AR are provided in the interior of the curved portion KRA, said ribs following the curved course thereof. In the exemplary embodiment, several arc-shaped drainage ribs AR are arranged substantially nested concentrically into one another and set at a transverse distance from one another in the interior of the curved portion KRA. They also extend in the exemplary embodiment here into the rising tube portion AU and into the descending tube portion AB over part of their length. These drainage ribs AR are arranged in vertical positions above the outlet ALA of the washing container SPB and of the inlet EI of the inlet-end tube portion RA1 of the air-guiding channel LK. These drainage ribs AR serve to absorb droplets of liquid and/or condensation from the air flow LS1 sucked out of the washing container SPB. In the region of the section of the upwardly rising tube portion AU, the droplets of liquid collected on the flow-guiding ribs AR can drip in the direction of the outlet ALA. In the region of the downwardly descending tube portion AB, the droplets of liquid can drip from the flow-guiding ribs AR in the direction of at least one return rib RR. The return rib RR is provided at a point in the interior of the descending tube portion AB which lies higher than the outlet opening ALA of the washing container SPB and/or which lies higher than the inlet opening EI of the air-guiding channel LK. The return rib RR in the interior of the descending tube portion AB forms a drainage incline and aligns with a cross-connecting line RF in the direction of the outlet ALA of the washing container SPB. The cross-connecting line RF bridges the intermediate space between the arm of the upwardly rising tube portion AU and the arm of the downwardly descending tube portion AB. The cross-connecting line RF consequently connects the interior of the upwardly rising tube portion AU and the interior of the downwardly descending tube portion AB to one another. The gradient of the return rib RR and of the adjacent, aligned cross-connecting line RF is chosen in such a way as to ensure a return of condensation and/or other drops of liquid which drip down from the drainage ribs AR in the region of the descending tube portion AB into the outlet opening ALA of the washing container SPB.

The drainage ribs AR are preferably fitted on the inner wall of the air-guiding channel LK facing away from the washing container side wall SW because this exterior inner wall of the air-guiding channel is cooler than the inner wall of the air-guiding channel facing toward the washing container SPB. On this cooler inner wall condensation precipitates more intensely than on the inner wall of the air-guiding channel LK facing toward the side wall SW. Thus, it may suffice for the drainage ribs AR to be embodied as web elements which project from the outward lying inner wall of the air-guiding channel LK only over a partial width of the total cross-sectional width of the air-guiding channel embodied as a flat channel in the direction of the inward-lying inner wall of the air-guiding channel facing the side wall SW, such that a lateral cross-sectional gap relative to the air through-flow remains. It may, however, optionally also be useful to embody the drainage ribs AR between the outward lying inner wall and the inward lying inner wall of the air-guiding channel LK continuously. In this way, particularly in the curved portion KRA, a more targeted guidance of air can be achieved. Disruptive air turbulence is largely avoided. A desired volume of air can in this way be conveyed through the air-guiding channel LK embodied as a flat channel.

The return rib RR is preferably fitted as a web element on the inside of the outward-lying inner wall of the air-guiding channel LK, said web element projecting over a partial width or partial extent of the total extent of the flat-design air-guiding channel LK in the direction of the inward-lying inner wall thereof. This ensures that an adequate passage cross-section remains free in the region of the return rib RR for the air flow LS1 to flow through. Alternatively, it can of course also be useful to embody the return rib RR as a continuous element between the outside inner wall and the inward-lying inner wall of the air-guiding channel LK and to provide in particular centrally located passage openings for the passage of air.

The drainage ribs AR and the return rib RR serve in particular to separate water droplets, detergent droplets, rinse aid droplets and/or other aerosols which are found in the inflowing air LS1 and to return them through the outlet opening ALA into the washing container SPB. This is particularly advantageous in a desorption process when a cleaning step is taking place simultaneously. During this cleaning step, a relatively large amount of steam or mist may be located in the washing container SPB, in particular due to the spraying of washing solution by means of the spray arms SA. Such steam or mist may contain both water and detergent, rinse aid and/or optionally other cleaning substances finely distributed. For these dispersed liquid particles carried along in the air flow LS1, the drainage ribs AR form a separating device. Instead of drainage ribs AR, other separating means can alternately also advantageously be provided, in particular structures having a multiplicity of edges such as e.g. wire meshes.

In particular, the obliquely upwardly or substantially vertically rising tube portion AU ensures that liquid droplets or even spray jets which are sprayed out by a spraying device SA such as, for example, a spray arm, during the cleaning cycle or other wash cycle, are largely prevented from being able to reach the sorption material of the sorption container directly via the sucked-in air flow LS1. Without this retention or this separation of liquid droplets, in particular mist droplets and steam droplets, the sorption material ZEO could be rendered inadmissibly moist and unusable for a sorption process in the drying step. In particular, premature saturation could occur due to the infiltration of liquid droplets such as e.g. mist droplets or steam droplets. The inlet-end rising branch AU of the through-channel and/or the one or more separating and capturing elements in the upper bend region and apical region of the curved portion KRA between the rising branch AU and the descending branch AB of the through-channel moreover also largely prevent detergent droplets, rinse-aid droplets and/or other aerosol droplets from being able to pass further down beyond this barrier to the fan LT and from there into the sorption container SB. Of course, it is also possible to provide in place of the combination of rising tube portion AU and descending tube portion AB and in place of the one or more separating elements a differently-embodied barrier arrangement with the same function.

To sum up, the dishwasher GS in the exemplary embodiment here comprises a drying device for drying items to be washed through sorption by means of reversibly dehydratable sorption material ZEO which is stored in a sorption container SB. Said sorption container is connected via at least one air-guiding channel LK to the washing container SPB for generating an air flow LS1. The air-guiding channel has along its inlet-end tube portion RA1 a substantially flatly rectangular cross-sectional geometric shape. Viewed in the direction of flow, after its inlet-end tube portion RA1, the air-guiding channel passes into a substantially cylindrical tube portion VA. It is preferably manufactured from at least one plastic material. It is arranged in particular in the intermediate space between a side wall SW and/or back wall RW of the washing container and an outer housing wall of the dishwasher. The air-guiding channel LK comprises at least one upwardly rising tube portion AU. It extends upward starting from the discharge opening ALA of the washing container SPB. It also comprises after the rising tube portion AU, viewed in the direction of flow, at least one downwardly descending tube portion AB. At least one curved portion KRA is provided between the rising tube portion AU and the descending tube portion AB. The curved portion KRA has in particular a greater cross-sectional area than the rising tube portion AU and/or the descending tube portion AB. One or more flow-guiding ribs AR for equalizing the air flow LS1 are provided in the interior of the curved portion KRA. At least one of the flow-guiding ribs AR optionally extends beyond the curved portion KRA into the rising tube portion AU and/or descending tube portion AB. The one or more flow-guiding ribs AR are provided in positions above the vertical position of the outlet ALA of the washing container SPB. The respective flow-guiding rib AR extends from the channel wall facing the washing-container housing to the opposing channel wall of the air-guiding channel LK facing away from the washing-container housing preferably substantially continuously. At least one return rib RR is provided in the interior of the descending tube portion AB on the channel wall facing the washing-container housing and/or channel wall of the air-guiding channel LK facing away from the washing-container housing at a point which lies higher than the inlet opening EI of the air-guiding channel LK. The return rib RR is connected to the inlet opening EI of the air-guiding channel LK via a cross-connecting line RF in the intermediate space between the rising tube portion AU and the descending tube portion AB for returning condensate. It exhibits a gradient toward the inlet opening EI. The return rib extends from the channel wall facing the washing-container housing to the opposing channel wall of the air-guiding channel LK facing away from the washing-container housing preferably only over a partial cross-sectional width.

In FIG. 3, the descending branch AB of the air-guiding channel LK is introduced substantially vertically into the fan unit LT. The air flow LS1 which is sucked in is blown by the fan unit LT at the output end via a tubular connecting section VAS into an inlet connecting piece ES of the sorption container SB coupled thereto into the region in the vicinity of the base thereof. The air flow LS1 flows into the lower region of the sorption container SB with an inflow direction ESR and switches to a different flow direction DSR with which it flows through the interior of the sorption container SB. This through-flow direction DSR runs from bottom to top through the sorption container SB. In particular, the inlet connecting piece ES steers the incoming air flow LS1 into the sorption container SB in such a way that said air flow is diverted from its inflow direction ESR in particular by approximately 90 degrees into the through-flow direction DSR through the sorption container SB.

In accordance with FIG. 3, the sorption container SB is arranged underneath the base BO in a base module BG of the washing container SPB in a largely freely-suspended manner such that for heat protection it has a predefined minimum gap distance LSP in relation to neighboring components and/or parts of the base module BG (see also FIG. 10). For the sorption container SB attached in a freely-suspended manner under the base BO of the base module BG, at least one transport securing element TRS is provided below said sorption container at a predefined clearance distance FRA such that the sorption container SB is supported from below in case the sorption container SB moves down from its freely-suspended position during transport. The sorption container SB comprises at least in the region of its sorption unit SE, in addition to its inner housing IG, at least one outer housing AG such that its total housing GT is embodied in a double-walled manner Consequently, an air gap clearance LS is present between the inner housing IG and the outer housing AG as a thermal insulation layer. The fact that the sorption container SB is embodied at least around the region in which its sorption unit SE is mounted partially or wholly in at least a double-walled manner provides, in addition to or independently of the freely-suspended mounting or accommodation of the sorption container SB, further overheating protection in order to adequately protect any neighboring parts or components of the base module BG against inadmissibly high overheating or combustion.

Expressed in general terms, the housing of the sorption container SB has a geometric shape such that circumferentially an adequate gap distance exists from the other parts and components of the base module BG as heat protection. For example, the sorption container SB has for this purpose on its housing wall SW2 facing the back wall RW of the base module BG an arched shape AF which corresponds to the geometric shape of the back wall RW facing it.

The sorption container SB is mounted on the underside of the base BO, in particular in the region of a through-opening DG (see FIG. 3, 13) of the base BO of the washing container SPB. This is illustrated in particular in the schematic side view of FIG. 3. There, the base BO of the washing container SPB has, starting from its outer edges ARA a gradient running toward a liquid collecting area FSB. The sorption container SB is mounted on the base BO of the washing container SPB in such a way that its cover part DEL runs substantially parallel to the underside of the base BO and at a predefined gap distance LSP therefrom. For positioning the sorption container SB in a freely-suspended manner, a coupling connection is provided between at least one coupling component on the underside of the base, in particular a socket SO, of the sorption container SB and a component on the top side of the base, in particular the outlet element AUS, of the sorption container SB in the region of a through-opening DG in the base BO of the washing container SPB. As a coupling connection, a clamping connection, in particular, is provided. The clamping connection may be formed by a detachable connection, in particular screw connection, with or without bayonet catch BJ (see FIG. 13) between the component of the sorption container SB on the underside of the base and the component of the sorption container SB on the top side of the base. An edge zone RZ (see FIG. 13) around the one through-opening DG of the base BO is clamped between an outlet component on the underside of the base such as e.g. SO of the sorption container SB, and the outlet element or spray protection component AUS arranged above the base BO. In FIG. 13, the base BO and subpart on the underside of the base are, for the sake of simplifying the drawing, indicated merely by dot-dash lines. The outlet component on the underside of the base and/or the spray protection component AUS on the top side of the base projects with its end-face end portion through the through-opening DG of the base BO. The outlet part on the underside of the base comprises a socket SO around the discharge opening AO of the cover part DEL of the sorption container SB. The spray protection component AUS on the top side of the base comprises an outflow connecting piece AKT and a spray protection hood SH. At least one sealing element DI1 is provided between the component AUS on the top side of the base and the component SO on the underside of the base.

In summary, the sorption container SB is thus arranged beneath the base BO of the washing container SPB in a largely freely-suspended manner such that for heat protection it has a predefined minimum gap distance LSP in relation to neighboring components and parts of the base module BG. Below the sorption container SPB a transport securing element TRS is additionally fixedly attached at a predefined clearance distance FRA to the base of the base module. This transport securing element TRS serves to brace, if necessary from below, the sorption container SB mounted in a freely-suspended manner below the base BO of the washing container SPB, if said sorption container oscillates downward together with the base BO, for example during transportation, due to vibrations. This transport securing element TRS may, in particular, be formed by a metal bracket bent downward in a U-shaped manner which is fixedly mounted on the base of the base module. The sorption container SB has on the top of its cover part DEL the outflow opening AO. An upwardly projecting socket SO is fitted around the outer rim of this outflow opening AO. A cylindrical socket connection element STE is fitted in the approximately circular opening of this socket SO (see FIGS. 4, 5, 9, 13), said element projecting upwardly and serving as a counterpart to the outflow connecting piece or exhaust chimney connecting piece AKT to be fastened thereto. It preferably has an external thread with integrated bayonet catch BJ, which interacts appropriately with the internal thread of the exhaust chimney connecting piece AKT. The socket SO has on its top seating edge running concentrically around the socket connecting piece STE the sealing ring DI1. This is illustrated in FIGS. 3, 4, 9, 13. The sorption container SB rests firmly pressed with this sealing ring DI1 against the underside of the base BO. It is held by the height of the socket SO at a distance or spacing LSP from the underside of the base BO. The exhaust chimney connecting piece AKT is inserted down through the through-opening DG of the base BO from the top of the base BO and screwed to the counterpart socket connecting piece STE and secured from opening by the bayonet catch BJ. The exhaust chimney connecting piece AKT abuts firmly, encircling the outer edge zone RZ of the base BO around the through-opening DG with its annular outer edge APR. This is because the outer edge zone RZ of the base BO around the through-opening DG is clamped in a liquid-tight manner between an encircling lower seating edge APR of the exhaust chimney connecting piece AKT and the upper seating edge of the socket AO by means of the sealing ring DI1 arranged there. Since the sealing ring DI1 presses on the base BO from the underside, it is protected against any impairments or damage by detergents in the washing solution from ageing. A liquid-tight through-connection between the exhaust chimney connecting piece AKT and the socket SO is formed in this way. This simultaneously functions advantageously as a suspension device for the sorption container SB.

The fact that the socket SO projects by a socket height LSP above the remaining surface of the cover part DEL ensures that a gap clearance is present between the cover part DEL and the underside of the base BO. The base BO of the washing container SPB in the exemplary embodiment here from FIG. 3 runs, starting from its encircling edge zone with the side walls SW and the back wall RW, with a gradient in an obliquely inclined manner toward a preferably central liquid-collecting area FSB. The pump sump PSU of a circulating pump UWP may be located therebelow (see FIG. 16). In FIG. 3, this base BO running from the outside inward at an incline toward the lower lying collecting area FSB is drawn in dashed and dotted lines. The arrangement of the pump sump PSU with the circulating pump UWP sitting therein underneath the lower lying collecting area FSB can be seen from the plan-view image of the base module from FIG. 16. The sorption container SB is preferably mounted on the base BO of the washing container SPB such that its cover part DEL runs substantially parallel to the underside of the base BO and at a predefined gap distance LSP therefrom. To this end, the socket SO is placed on the socket connecting piece STE sitting therein obliquely at an appropriate angle of inclination relative to the surface normal of the cover part DEL.

According to FIGS. 4 to 10, the sorption container SB comprises a pot-type housing part GT which is closed by means of a cover part DEL. There is provided in the pot-type housing part GT at least the sorption unit SE comprising reversibly dehydratable sorption material ZEO. The sorption unit SE is accommodated in the pot-type housing part GT in such a way that an air flow LS2 can flow through its sorption material ZEO substantially in or against the direction of gravity, said air flow LS2 being generated through diversion of the air flow LS1 brought via the air-guiding channel LK. The sorption unit SE comprises at least one lower sieve element or grid element US and at least one upper sieve element or grid element OS at a predefinable vertical distance H from one another (see in particular FIG. 9). The spatial volume between the two sieve elements or grid elements US, OS is to a large extent completely filled with the sorption material ZEO. At least one heating device HZ is provided in the pot-type housing part GT. In the pot-type housing part GT, said heating device is, viewed in the through-flow direction DSR of the sorption container SB, provided in particular upstream of the sorption unit SE comprising the reversibly dehydratable sorption material ZEO. The heating device HZ is provided in a lower cavity UH of the pot-type housing part GT for collecting inflowing air LS1 from the air-guiding channel LK. The inlet opening EO for the air-guiding channel LK is provided in the pot-type housing part GT. The discharge opening AO for the outlet element AUS is provided in the cover part DEL. A heat-resistant material, in particular metal sheet, preferably stainless steel or a stainless steel alloy, is preferably used for the cover part DEL and the pot-type housing part GT. The cover part DEL closes off the pot-type housing part GT to a large extent hermetically. The circumferential outer edge of the cover part DEL is connected to the upper edge of the pot-type housing part GT only by a mechanical connection, in particular by a deforming connection, a joining connection, a latching connection, a clamping connection, in particular by a beaded connection or a clinched connection. The pot-type housing part GT comprises one or more side walls SW1, SW2 (see FIG. 5) which run substantially vertically. It has an external contour which corresponds substantially to the internal contour of an installation area EBR provided for it, in particular in a base module BG (see FIG. 16). The two adjacent side walls SW1, SW2 have external surfaces which run substantially at right angles to one another. At least one side wall such as e.g. SW2, has at least one shape such as e.g. AF which is embodied in a substantially complementary manner to match a shape on the back wall and/or side wall of the base module BG, which is provided under the base BO of the washing container SPB. The sorption container SB is provided in a rear corner area EBR between the back wall RW and an adjacent side wall SW of the dishwasher GS, in particular the base module BG thereof.

Figure 4:
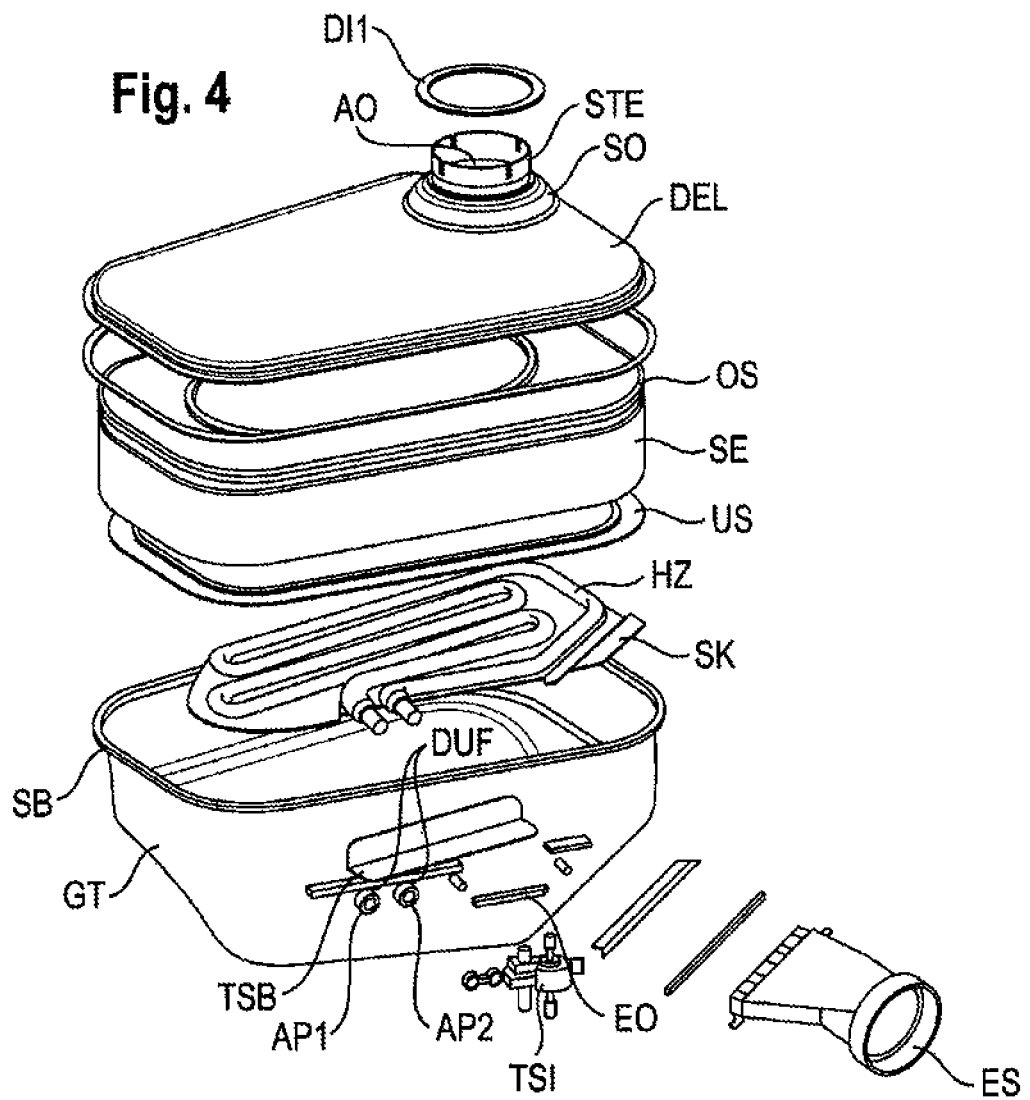
FIG. 4 shows as an individual item schematically in exploded perspective representation various components of the sorption container of the sorption drying system from FIGS. 1 to 3.
Figure 5:
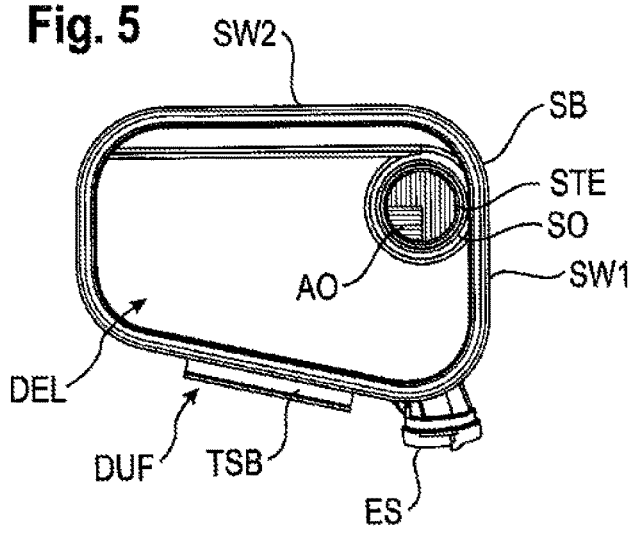
FIG. 5 shows schematically in plan view the sorption container from FIG. 4.
Figure 9:
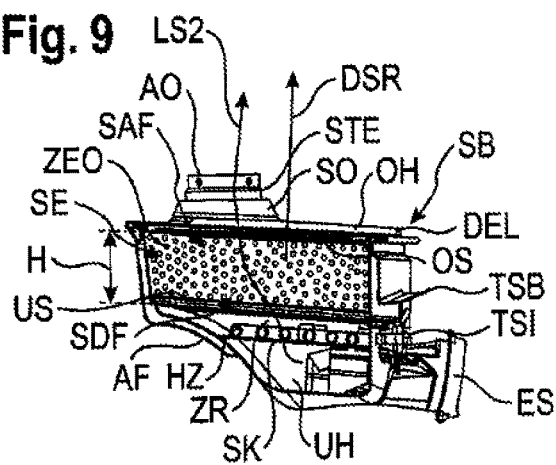
FIG. 9 shows in schematic sectional representation, viewed from the side, the sorption container of FIGS. 4, 5.
Figure 8:
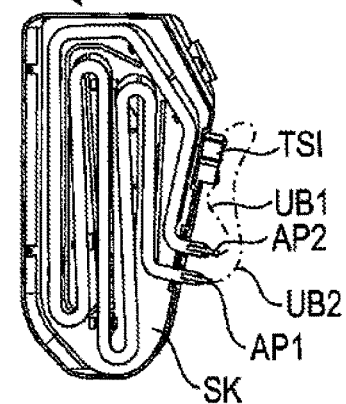
FIG. 8 shows in schematic plan representation, viewed from above, the coiled-tube heater from FIG. 7 which is arranged above the slotted sheet from FIG. 6.
Figure 6:
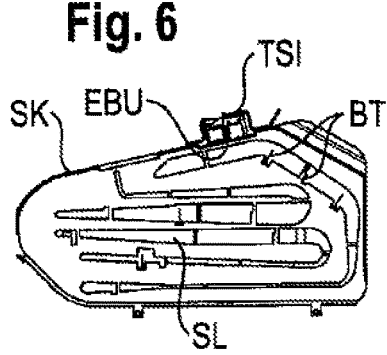
FIG. 6 shows in schematic plan view from below, as a component of the sorption container from FIG. 5, a slotted sheet for the flow conditioning of air which flows through sorption material in the sorption container.
Figure 7:
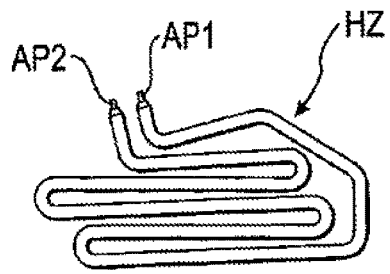
FIG. 7 shows in schematic plan view from below, as a further detail of the sorption container from FIG. 4, a coiled-tube heater for heating sorption material in the sorption container for the desorption thereof.

The pot-type housing part GT comprises at least one through-opening DUF for at least one electrical contact element AP1, AP2 (see FIG. 4). A drip-protection sheet TSB is mounted in a roofing area above the through-opening DUF at least over the extension thereof. The drip-protection sheet TSB has a drainage incline.

FIG. 4 shows in a schematic and perspective exploded view the various components of the sorption container SB in a disassembled state. The components of the sorption container SB are arranged in multiple positional planes above one another. This structural design, layered from bottom to top, of the sorption container SB is illustrated in particular in the sectional view of FIG. 9 and in the sliced perspective representation of FIG. 10. The sorption container SB comprises the lower cavity UH close to the base for collecting inflowing air from the inlet connecting piece ES. Above this lower cavity UH sits a slotted sheet SK which serves as a flow-conditioning means for a coiled-tube heater HZ arranged thereabove. The slotted sheet SK sits on a circumferential supporting edge around the interior of the sorption container SB. This supporting edge has a predefined vertical distance relative to the inner base of the sorption container SB for forming the lower cavity UH. The slotted sheet SK preferably has one or more clamping parts in order to clamp it laterally or on the side to a partial surface, to at least one inner wall of the sorption container SB. A reliable securing in position of the slotted sheet SK can be provided by this means. In accordance with the view of the slotted sheet from below of FIG. 6, this slotted sheet has slots SL which substantially follow the course of the coil of the coiled-tube heater arranged over the slotted sheet SK. The slots or passages SL of the slotted sheet SK are embodied larger, in particular wider or broader, at those locations at which the air flow LS1 entering the sorption container SB has a lower velocity in the through-flow direction DSR through the sorption container than at those locations at which the air flow LS1 entering the sorption container has a greater velocity in the through-flow direction DSR through the sorption container SB. This achieves to a large extent an equalization of the local flow cross-sectional profile of the air flow LS2, which flows through the sorption container SB from bottom to top in a through-flow direction DSR. Within the scope of the invention, equalization of the local flow cross-sectional profile of the air flow is understood in particular to mean that substantially the same volume of air passes through with approximately the same flow velocity substantially at every entry point of a through-flow surface.

The coiled-tube heater RZ is arranged, viewed in the direction of flow-through DSR, with a predefined vertical clearance behind the slotted sheet SK. To achieve this, it can be held by means of a multiplicity of sheet parts BT which are embodied in a web-like manner at a vertical distance above the passages SL. These sheet parts BT (see FIG. 6) support preferably alternately from below and from above the run of the coiled-tube heater. This makes it possible firstly for the coiled-tube heater HZ to be reliably secured in position above the slotted sheet SK. Secondly, warping of the slotted sheet SK which can occur under the heat generated by the coiled-tube heater HZ is largely avoided. Viewed in the through-flow direction DSR, the coiled-tube heater HZ is followed by a free intermediate space ZR (see FIG. 9) until the rising, substantially from bottom to top, air flow LS2 enters the inlet cross-sectional area SDF of the sorption unit SE. This sorption unit SE comprises on the inlet side a lower sieve element or grid element US. An outlet-side upper sieve element or grid element OS is provided at a vertical distance H from this sieve element or grid element US. For the two sieve elements US, OS, supporting edges are provided in portions of or all around the inner walls of the sorption container in order to position and to hold the sieve elements US, OS in their assigned vertical position. The two sieve elements US, OS are preferably arranged parallel to one another at this predefined vertical distance H. Between the lower sieve element US and the upper sieve element OS, the sorption material ZEO is filled such that the volume between the two sieve elements US, OS is largely completely filled. When the sorption container SB is in the installed state, the inlet-end sieve element US and the outlet-end sieve element OS are arranged, relative to the vertically running central axis of the sorption container SB and relative to the through-flow direction DSR thereof, in substantially horizontal positional planes above one another at the predefined vertical distance H from one another. In other words, the sorption unit SE is therefore formed in the exemplary embodiment here by a filling volume of sorption material ZEO between a lower sieve element US and an upper sieve element OS. Viewed in the through-flow direction DSR, the upper cavity OH for collecting outflowing air is provided above the sorption unit SE. This outflowing air LS2 is guided by the outlet AO of the socket connecting piece STE into the exhaust chimney connecting piece ATK, from where it is blown out into the interior of the washing container SPB.

Flow-conditioning or flow-influencing of the flow LS2 rising from bottom to top in the through-flow direction DSR is performed by the slotted sheet SK such that substantially the same air volume flow flows around the coiled-tube heater substantially at each point of its longitudinal extent. The combination of slotted sheet and coiled-tube heater HZ arranged thereabove to a large extent ensures that the air flow LS2 can be heated largely uniformly during the desorption process upstream of the intake area of the lower sieve US. The slotted sheet thereby provides for a largely uniform local distribution of the heated air volume flow viewed over the intake cross-sectional area SDF of the sorption unit SE.

In addition to or independently of the slotted sheet SK, it can optionally also be useful to provide a heating device outside the sorption container SB in the connecting section between the fan unit LT and the inlet opening EO of the sorption container SB. Because the passage cross-sectional area of this tubular connecting section VA is less than the average cross-sectional area of the sorption container SB for an air flow, the air flow LS1 may, before it enters the sorption container SB, already be heated largely uniformly for the desorption process in advance. The slotted sheet SK can then optionally be omitted completely.

Particularly if the heating of the air is carried out by means of a heating device in the sorption container SB, it can optionally also be useful to provide, viewed in the through-flow direction DSR of the sorption container SB, both upstream and downstream of the heating device HZ at least one flow-conditioning element in each case such that approximately the same air volume flow can flow at each point through the amount by volume of sorption material ZEO behind the inlet cross-sectional area SDF of the lower sieve element US. In this way, in particular also during the sorption process during which the heating device HZ is deactivated, i.e. is switched off, it is largely achieved that all the sorption material is to a large extent completely involved in the dehumidification of the through-flowing air LS1. In an analogous manner, in the desorption process in which the through-flowing air LS2 is heated up by the heating device HZ, stored water is caused to re-emerge from all the sorption material in the intermediate space between the two sieve elements US, OS such that at all points inside this spatial volume the sorption material ZEO can be made available, substantially fully dried and thus regenerated, for a subsequent drying process.

The through-flow cross-sectional area SDF of the sorption unit SE in the interior of the sorption container SB is embodied in the exemplary embodiment here to be greater than the average cross-sectional area of the inlet connecting piece ES on the end of the air-guiding channel LK or of the tubular connecting section VA. The through-flow cross-sectional area SDF of the sorption material is preferably embodied to be between 2 and 40 times, in particular between 4 and 30 times, preferably between 5 and 35 times greater than the average cross-sectional area of the inlet connecting piece ES of the air-guiding channel LK with which said connecting piece opens into the intake opening EO of the sorption container SB.

In summary, the sorption material ZEO fills a fill volume between the lower sieve element US and the upper sieve element OS so that it has the flow intake cross-sectional area SDF and a flow discharge cross-sectional area SAF substantially perpendicular to the through-flow direction DSR which runs substantially in a vertical direction. The lower sieve element US, the upper sieve element OS and the sorption material ZEO embedded therebetween each have penetration areas which are congruent in relation to one another for the through-flowing air LS2. This largely ensures that at each point in the volume of the sorption unit SE, the sorption material thereof can be subjected to approximately the same volume flow. During desorption, points of overheating and thus any overloading or other damage to the sorption material ZEO are in this way largely prevented. During sorption, uniform absorption of moisture from the moist air to be dried and thus optimum use of the sorption material ZEO provided in the sorption unit SE is consequently enabled.

Summing up in general terms, it can therefore be useful to provide one or more flow-conditioning elements SK in the sorption container SB and/or in an inlet-end tube portion VA, ES of the air-guiding channel LK, in particular downstream of at least one fan unit LT inserted into the air-guiding channel LK, with one or more air passages SL such that equalization of the local flow cross-sectional profile of the air flow LS2 is effected when flowing through the sorption container SB in the through-flow direction DSR thereof, said through-flow direction being oriented from bottom to top. Viewed in the through-flow direction DSR of the sorption container SB, at least one flow-conditioning element SK is provided in the lower cavity UH thereof at a vertical distance upstream of the heating device HZ. In the exemplary embodiment here, a slotted sheet or perforated sheet is provided as the flow-conditioning element. The slots SL in the slotted sheet SK substantially trace the course of the winding of a coiled-tube heater HZ which is positioned as a heating device at a clearance distance above the slots SL in the slotted sheet. The slotted sheet is arranged substantially parallel to and at a clearance distance from the air intake cross-sectional area SDF of the sorption unit SE of the sorption container SB. Air passages, in particular slots SL, in the flow-conditioning element SK are embodied so as to be larger at those locations at which the air flow LS1 entering the sorption container SB in the through-flow direction DSR of the sorption container SB has a lower velocity than at those locations at which the air flow LS1 entering the sorption container SB in the through-flow direction DSR of the sorption container SB has a greater velocity.

In summary, the sorption drying system TS exhibits the following specific flow conditions in the region of the sorption container SB. The air-guiding channel LK is coupled to the sorption container SB such that the entering air flow LS1 opens into the sorption container SB with a direction of inflow ESR and passes into a through-flow direction DSR which is different therefrom, with which it flows through the interior of the sorption container SB. The outflow direction of the air flow LS2 exiting the sorption container SB preferably corresponds substantially to the through-flow direction DSR. The tube portion RA1 of the air-guiding channel LK opens into the sorption container SB such that its inflow direction ESR is diverted into the through-flow direction DSR of the sorption container SB, in particular by between 45° and 135°, preferably by approximately 90°. Viewed in the direction of flow, upstream of the sorption container SB at least one fan unit LT is inserted into the inlet-end tube portion RA1 of the air-guiding channel LK for generating a forced air flow LS1 in the direction of at least one intake opening EO of the sorption container SB. The fan unit LT is arranged in the base module underneath the washing container SPB. The through-flow cross-sectional area SDF for the sorption material ZEO in the interior of the sorption container is embodied so as to be greater than the passage cross-sectional area of the inlet connecting piece ES of the air-guiding channel LK with which said air-guiding channel opens into the inlet opening EO of the sorption container SB. The through-flow cross-sectional area SDF of the sorption container SB is preferably embodied so as to be between 2 and 40 times, in particular between 4 and 30 times, preferably between 5 and 25 times, greater than the passage cross-sectional area of the inlet connecting piece ES on the end of the air-guiding channel LK with which said air-guiding channel opens into the intake opening EO of the sorption container SB. At least one sorption unit SE comprising sorption material ZEO is accommodated in the sorption container such that air LS1 can flow through the sorption material ZEO substantially in or against the direction of gravity, said air being guided out of the washing container SPB into the sorption container SB via the air-guiding channel LK. The sorption unit SE of the sorption container SB comprises at least one lower sieve element or grid element US and at least one upper sieve element or grid element OS at a predefinable vertical distance H from one another, the spatial volume between the two sieve elements or grid elements US, OS being largely completely filled with the sorption material ZEO. The intake cross-sectional area SDF and the discharge cross-sectional area SAF of the sorption unit SE of the sorption container SB are chosen so as to be in particular substantially equal in size. The intake cross-sectional area SDF and the discharge cross-sectional area SAF of the sorption unit SE of the sorption container SB are furthermore usefully arranged substantially congruently in relation to one another. The sorption container comprises, viewed in its through-flow direction DSR, at least one layering comprising a lower cavity UH and a sorption unit SE arranged thereabove, arranged downstream in the through-flow direction DSR. It has in its lower cavity UH at least one heating device HZ. The sorption container SB comprises above its sorption unit SE at least one upper cavity OH for collecting outflowing air LS2. The sorption material ZEO fills a fill volume in the sorption unit SE of the sorption container SB such that a flow intake cross-sectional area SDF arranged substantially perpendicular to the through-flow direction DSR and a flow discharge cross-sectional area SAF arranged largely parallel thereto is formed. The sorption container has in its upper cover part DEL at least one outflow opening AO which is connected with the aid of at least one outflow component AKT via a through-opening DG in the base BO of the washing container SPB to the interior thereof.

The sorption material ZEO is advantageously embedded in the sorption container SB in the shape of the sorption unit SE such that a substantially equal air volume flow value can be applied to substantially each entry point to the through-passage cross-sectional area SDF of the sorption unit SE. An aluminum- and/or silicon-oxide-containing, reversibly dehydratable, material, silica gel and/or zeolite, in particular type A, X, Y zeolite, is preferably provided, either singly or in any combination, as the sorption material ZEO. The sorption material is provided in the sorption container SB usefully in the form of a granular solid or granulate comprising a multiplicity of particles having a grain size substantially between 1 and 6 mm, in particular between 2.4 And 4.8 mm, as a fill, the fill height H of the particles corresponding to at least 5 times their grain size. The sorption material ZEO present as a granular solid or granulate is usefully present in the sorption container with a fill height H in the direction of gravity which corresponds to substantially 5 to 40 times, in particular 10 to 15 times the particle size of the granular solid or granulate. The fill height H of the sorption material ZEO is preferably chosen so as to be substantially between 1.5 and 25 cm, in particular between 2 and 8 cm, preferably between 4 and 6 cm. The granular solid or granulate can preferably be composed of a multiplicity of substantially spherical particles. The sorption material (ZEO) embodied as a granular solid or as a granulate has an average fill density of at least 500 kg/m$^3$, in particular essentially between 500 and 800 kg/m$^3$, in particular between 600 and 700 kg/m$^3$, in particular between 630 and 650 kg/m$^3$, in particular preferably of approximately 640 kg/m$^3$.

In the sorption container SB, the reversibly dehydratable sorption material ZEO for absorbing a quantity of moisture transported in the air flow LS2 is usefully provided in a quantity by weight such that the quantity of moisture absorbed by the sorption material ZEO is lower than a quantity of moisture applied to the items to be washed, in particular a quantity of moisture applied in the rinsing step.

It can in particular be useful if in the sorption container SB the reversibly dehydratable sorption material is provided in a quantity by weight such that this is sufficient to absorb a quantity of moisture which corresponds substantially to a wetting quantity with which the items to be washed are wetted after the end of a rinsing step. The absorbed quantity of water corresponds preferably to between 4 and 25%, in particular between 5 and 15%, of the quantity of liquid applied to the items to be washed.

The sorption container usefully accommodates an amount by weight of sorption material ZEO of substantially between 0.2 and 5 kg, in particular between 0.3 and 3 kg, preferably between 0.5 and 2.5 kg.

The sorption material has in particular pores preferably of substantially between 1 and 12 Angstroms, in particular between 2 and 10, preferably between 3 and 8 Angstroms, in size.

It usefully has a water absorption capacity of substantially between 15 and 40 percent, preferably between 20 and 30 percent of its dry weight.

In particular, a sorption material is provided which can be desorbed at a temperature substantially in the range between 80° and 450° C., in particular between 220° C. and 250° C.

The air-guiding channel, the sorption container, and/or one or more additional flow-influencing elements are usefully embodied such that an air flow can be effected through the sorption material for the sorption and/or desorption thereof with a volume flow of substantially between 2 and 15 l/sec, in particular between 4 and 7 l/sec.

It can in particular be useful if at least one heating device is assigned to the sorption material, by means of which heating device an equivalent heat output of between 250 and 2500 W, in particular between 1000 and 1800 W, preferably between 1200 and 1500 W can be provided for heating the sorption material for the desorption thereof.

The ratio of heat output of at least one heating device which is assigned to the sorption material for the desorption thereof and air volume flow of the air flow which flows through the sorption material is preferably chosen so as to be between 100 and 1250 W sec/l, in particular between 100 and 450 W sec/l, preferably between 200 and 230 W sec/l.

In the sorption container, a through-flow cross-sectional area for the sorption material of substantially between 80 and 800 cm$^2$, in particular between 150 and 500 cm$^2$, is preferably provided.

The fill height H of the sorption material ZEO via the inlet cross-sectional area SDF of the sorption container SB is usefully substantially constant.

It is in particular useful to embody the sorption material in the sorption container so as to absorb a quantity of water of substantially between 150 and 400 ml, in particular between 200 and 300 ml.

Furthermore, for at least one component of the sorption drying system TS, at least one thermal overheating-protection device (see FIGS. 4, 6, 8, 9) is provided. Such a component can preferably be formed by a component of the sorption container SB. At least one thermal overheating-protection device TSI can be assigned to this component. This thermal overheating-protection device TSI is affixed to the outside of the sorption container SB. At least one electrical temperature protection unit TSI is provided as a thermal overheating-protection device. It is assigned in the exemplary embodiment here to the heating device HZ which is accommodated in the sorption container SB.

The electrical temperature-protection unit TSI is provided in the exemplary embodiment of FIGS. 4, 6, 8 and 9 in an outside recess EBU on the inner housing IG of the sorption container SB in the region of the vertical position of the heating device HZ. It comprises at least one electrical thermal switch TSA and/or at least one fuse SSI (see FIG. 17). The electrical thermal switch TSA and/or the fuse SSI of the electrical temperature-protection unit TSI are respectively inserted, preferably in series, into at least one electrical power supply line UB1, UB2 of the heating device HZ (see FIG. 8).

It can furthermore be useful to provide at least one control device HE, ZE (see FIG. 16) which in particular in the case of a fault interrupts the power supply to the heating device HZ. The exceeding of an upper temperature limit, for example, constitutes a fault case.

Furthermore, the largely freely-hanging suspension of the sorption container, particularly underneath the base BO of the washing container SPB, can also serve as a thermal overheating-protection measure.

The thermal overheating-protection measure can furthermore comprise a positioning of the sorption container SB such that the sorption container has a predefined minimal gap distance LSP in relation to neighboring components and/or parts of a base module BG.

As a thermal overheating-protection device, there can be provided in addition to, or independently of, the measures indicated above, at least in the region of the sorption unit SE of the sorption container SB at least one outer housing AG in addition to the inner housing IG of the sorption container SB. Between the inner housing IG and the outer housing AG, an air gap clearance LS is present as a thermal insulation layer.

Figure 17:
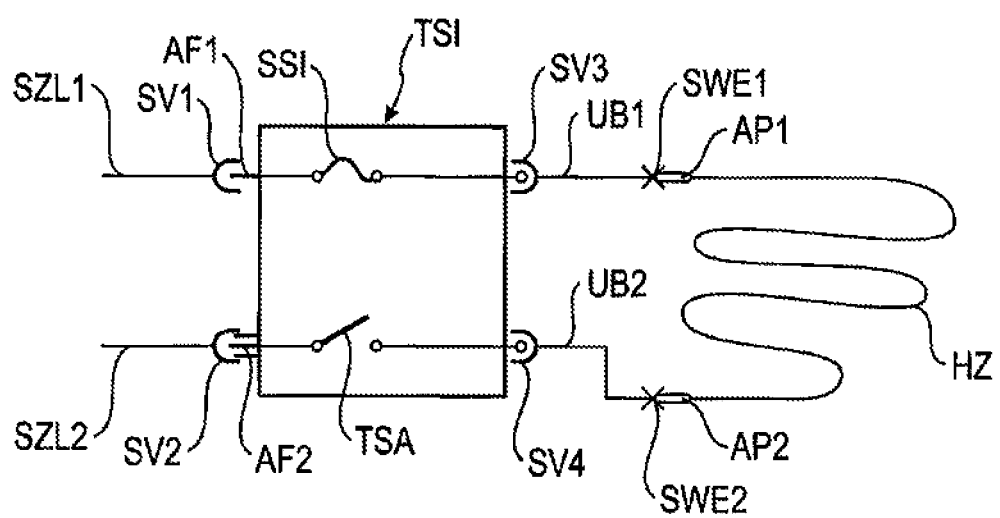
FIG. 17 shows in schematic representation the thermoelectric heat protection of the sorption container of FIGS. 4 to 10 of the sorption drying system of FIGS. 1 to 3, 11.

The coiled-tube heater HZ of FIGS. 4, 7, 8, 9 comprises two terminal poles AP1, AP2 which are guided outwardly through corresponding through-openings in the housing of the washing container SPB. Each terminal pole or terminal pin AP1, AP2 is preferably switched in series with an overheating-protection element. The overheating-protection elements are grouped in the temperature protection unit TSI which is arranged externally on the housing of the sorption container SB in the vicinity of the two pole pins AP1, AP2. FIG. 17 shows the overheating-protection circuit for the coiled-tube heater HZ from FIG. 8. The first bypass line UB1 is attached to the first rigid pole pin AP1 by means of a welded connection SWE1. In an analogous manner, the second bypass line UB2 is attached to the second rigid pole pin AP2 by means of a welded connection SWE2. By means of a plug-in connection SV4, the bypass line UB2 is electrically contacted to the thermal switch TSA. The bypass line UB1 is electrically connected via a plug-in contact SV3 to the thermoelectric fuse SSI. At the input end, a first power supply line SZL1 is connected via a plug-in connection SV1 to the outwardly guided terminal lug AF1 of the fuse element SSI. In an analogous manner, a second power supply line SZL2 is connected via a plug-in connection SV2 to the outwardly guided terminal lug AF2 of the thermal switch element TSA. The second power supply line SZL2 can, in particular, form a neutral conductor, while the first power supply line SZL1 can be a "live phase". The thermal switch TSA opens as soon as a first upper limit for the temperature of the coiled-tube heater HZ is exceeded. As soon as the temperature falls below this limit again, it closes again so that the coiled-tube heater HZ is heated up once again. If, however, a critical upper temperature limit, which lies above the first upper limit, for the coiled-tube heater is reached, then the fuse SSI melts through and the electric circuit for the coiled-tube heater HZ is permanently interrupted. The two temperature-protection elements of the temperature-protection device TSI are in largely intimate heat-conducting contact with the inner housing IG of the sorption container. They can be separately detached from one another if certain upper temperature limits specifically assigned to them are exceeded.

Figure 14:
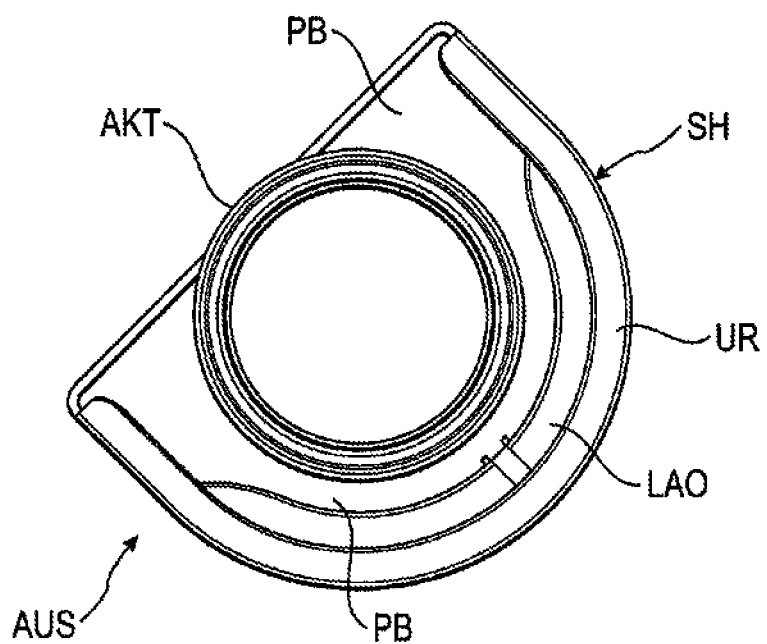

In accordance with FIGS. 10, 13, 14, the outflow connecting piece AKT which is connected to the outlet opening AO in the socket SO of the sorption container SB passes through the through-opening GK in the base BO preferably in a corner region EBR of the washing container SPB which lies outside the area of rotation swept over by the spray arm SA. This is illustrated in FIG. 2. Expressed in general terms, the outflow connecting piece AKT thus projects out of the base BO into the interior of the washing container SPB at a point which lies outside the area of rotation covered by the lower spray arm SA. The exhaust chimney connecting piece or the outflow connecting piece AKT is overlapped or covered over along its upper end portion by a spray-protection hood SH. The spray-protection hood SH covers over the outflow connecting piece AKT in an umbrella-like or mushroom-like manner. It is viewed from above. This spray-protection hood is, viewed from above (see FIG. 12) completely closed on the top-side; it is also, in particular, also completely closed on its underside in a region facing the spray arm SA. It exhibits in the exemplary embodiment here in a first approximation the geometric shape of a semi-circular cylinder. The spray-protection hood SH is represented schematically, viewed from above, in FIG. 12. On its top side, it has in the transition zones GF, URA between its largely planar top side and its substantially vertically downwardly projecting side walls (viewed from inside to outside) convexly curved flattening portions GF (see FIG. 13). If a spray jet, e.g. from the spray arm SA, strikes these transition zones GF, URA which are flattened out on the top edge or curved, then this spray jet pours like a film largely over the full surface of the spray-protection hood SA and cools this hood during the desorption process.

In order to prevent liquid during spraying with the lower spray arm SA from being able to pass through the discharge opening of the outflow connecting piece AKT into the sorption container, a lower edge zone of the semi-circular-cylinder-portion-like side wall of the spray protection hood SH is curved, arched or bent inwardly toward the outflow connecting piece AKT. This can readily be seen in FIG. 13. In addition, in the region of the top edge of the outflow connecting piece AKT, an encircling and radially outwardly projecting spray-water deflecting element or shielding element PB, in particular a baffle plate, is provided. This shielding element projects radially outwardly into the intermediate space or gap space between the cylindrical outflow connecting piece AKT and the inner wall of the spray-protection hood SH. Between the outer peripheral edge of this shielding element PB and the inner wall of the spray-protection hood SH there remains a free through-opening for the air flow LS2 which flows out from the outflow connecting piece AKT in the direction of the cover of the spray-protection hood SH and in doing so is diverted downwardly to the lower edge UR of the spray-protection hood SH, in particular by approximately 180°. The deflection path is labeled ALS in FIG. 13. The outwardly projecting shielding element PB is supported in the exemplary embodiment of FIG. 13 at individual circumferential points of its outer edge by means of web elements SET against the inner wall of the side wall of the spray-protection hood SH which encircles in the form of a ring segment portion. The spray-protection hood SH is arranged at a free vertical distance opposite the outlet connecting piece AKT, forming a free space or cavity.

FIG. 14 shows the spray-protection hood SH, viewed from below, together with the outflow connecting piece AKT. The shielding element PB shields the discharge opening of the outflow connecting piece AKT as a laterally or sideways projecting edge or web in a substantially circumferential manner. In particular, the shielding element PB closes off the underside of the spray-protection hood SH in the region of the rectilinear side wall facing the spray arm SA. Only in the semi-circularly bent portion of the spray-protection hood SH facing away from the spray arm between the shielding element PB and the externally concentrically arranged side wall of the spray-protection hood SH running in a radially offset manner is a gap clearance LAO cleared through which the air can flow out from the outflow connecting piece AKT into the interior of the washing container SPB. In the exemplary embodiment here from FIG. 14, the gap clearance LAO is substantially embodied in a sickle-like manner. The air flow LS2 is forced thereby onto the diverted path ALS which diverts it from its vertically upwardly oriented outflow direction downward where it can exit only through the sickle-shaped gap clearance LAO in the shape of a segment of a divided circle in the lower region of the spray-protection hood SH. The outflow connecting piece AKT usefully projects to a height HO relative to the base BO such that its top edge lies higher than the level of a set total wash-tank volume or foam volume envisaged for a wash cycle.

The outflow element AUS which is affixed at the outlet end of the sorption container SB and projects into the interior of the washing container SPB is therefore usefully embodied such that the air flow LS2 exiting from it is directed away from the spray arm SA. In particular, the outflowing air flow LS2 is guided into a rear or back corner region between the back wall RW and the adjacent side wall SW of the washing container. This largely prevents spray-water or foam from being able to pass through the opening of the outflow connecting piece into the interior of the sorption container during the cleaning cycle or any other wash cycle. The desorption process could otherwise be impaired or completely nullified in this way. In addition, sorption material could be permanently damaged by washing solution. Extensive tests have in fact shown that the functionality of the sorption material in the sorption container can be largely retained or preserved over the life time of the dishwasher if water, detergent and/or rinse aid in the washing solution is reliably prevented from reaching the sorption material.

In summary, at least one outflow device AUS which is connected to at least one outflow opening AO of the sorption container SB is arranged in the interior of the washing container SPB such that air LS2 blown out from it is largely directed away from at least one spray device SA accommodated in the washing container SPB. The outflow device AUS is arranged outside the working area of the spray device SA. The spray device can be e.g. a rotating spray arm SA. The outflow device AUS is preferably provided in a rear corner region EBR between the back wall RW and an adjacent side wall SW of the washing container SPB. The outflow device AUS has in particular an exhaust opening ABO at a vertical distance HO above the base BO of the washing container SPB, said exhaust opening lying higher than the level of a set total wash-tank volume envisaged for a wash cycle. The outflow device AUS comprises an outflow connecting piece AKT and a spray-protection hood SH. The spray-protection hood SH has a geometric shape which slips over the exhaust opening ABO of the outflow connecting piece AKT. The spray-protection hood SH is slipped over the outflow connecting piece AKT such that air flowing up through the outflow connecting piece AKT out of the sorption container SB with a rising direction of flow can, after its exit from the exhaust opening ABO of the outflow connecting piece AKT, have a downwardly directing forced flow path ALS impressed upon it. The upwardly projecting outflow connecting piece AKT above the base BO of the washing container SPB is coupled to the terminal connecting piece STE on the cover part DEL of the sorption container SB arranged under the base BO. The spray-protection hood SH is, in its housing region GF facing the spray device SA, embodied in a closed manner both on the top and on the underside. The spray-protection hood SH overlaps the exhaust opening ABO of the outflow connecting piece AKT with an upper free space. The outflow connecting piece AKT has an upper, outwardly arched edge or circumferential collar KR. The spray-protection hood SH envelops an upper end portion of the outflow connecting piece AKT so as to form a gap clearance SPF between its inner wall and the outer wall of the outflow connecting piece AKT. The gap clearance SPF between the spray-protection hood SH and the outflow connecting piece AKT is embodied such that an air outflow path ALS out of the outflow connecting piece AKT is provided which is directed away from the spray device SA in the washing container SB. A spray-water deflecting element PB projecting into the gap clearance SPF is provided on the outflow-connecting piece AKT. A lower edge zone UR of the spray-protection hood SH is arched inwardly.

The spray-protection hood SH has a rounded outer surface such that it causes a spray jet from the spray device SA which strikes it to pour over its surface like a film.

Figure 15:
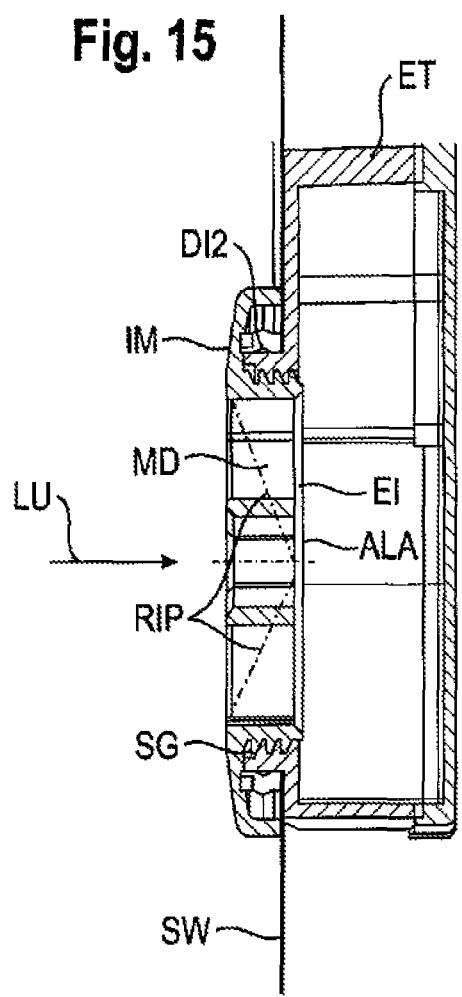
FIG. 15 shows in schematic sectional representation, viewed from the side, the inlet element of the sorption drying system of FIGS. 1 to 3 as an individual item.

FIG. 15 shows a schematic longitudinal representation of the fixing of the inlet-side, frontal end portion ET of the air-guiding channel LK in the region of the outlet opening ALA in the side wall SW of the washing container SPB of FIG. 2. The frontal end portion ET of the air-guiding channel LK projects into the interior of the washing container SPB such that a collar edge is formed circumferentially projecting perpendicularly in relation to the side wall SW. This collar edge has an internal thread SH. An annular inlet element IM with an external thread is screwed into this internal thread SG. It therefore functions as a fixing element for holding the end portion ET. This annular fixing element has a toroidal encircling receiving chamber for a sealing element DI2. This sealing element DI2 seals an annular gap between the outer edge of the inlet-side frontal end portion ET of the air-guiding channel LK and the fixing element. The fixing element in the exemplary embodiment here is formed in particular by a screw-cap-like threaded ring which is screwed to the inlet-side frontal end portion ET of the air-guiding channel LK. In the exemplary embodiment, the annular fixing element IM has a central through passage MD through which air LU can be sucked out of the interior of the washing container SPB.

It can optionally also be useful to provide in or in front of the inlet opening MD of the inlet-end tube portion ET of the air-guiding channel LK at least one ribbed engagement protection which has between its engagement ribs RIP freely passable gaps for the inflow of air LU out of the washing container. These ribs RIP are indicated in FIG. 15 by dashed and dotted lines.

Figure 16:
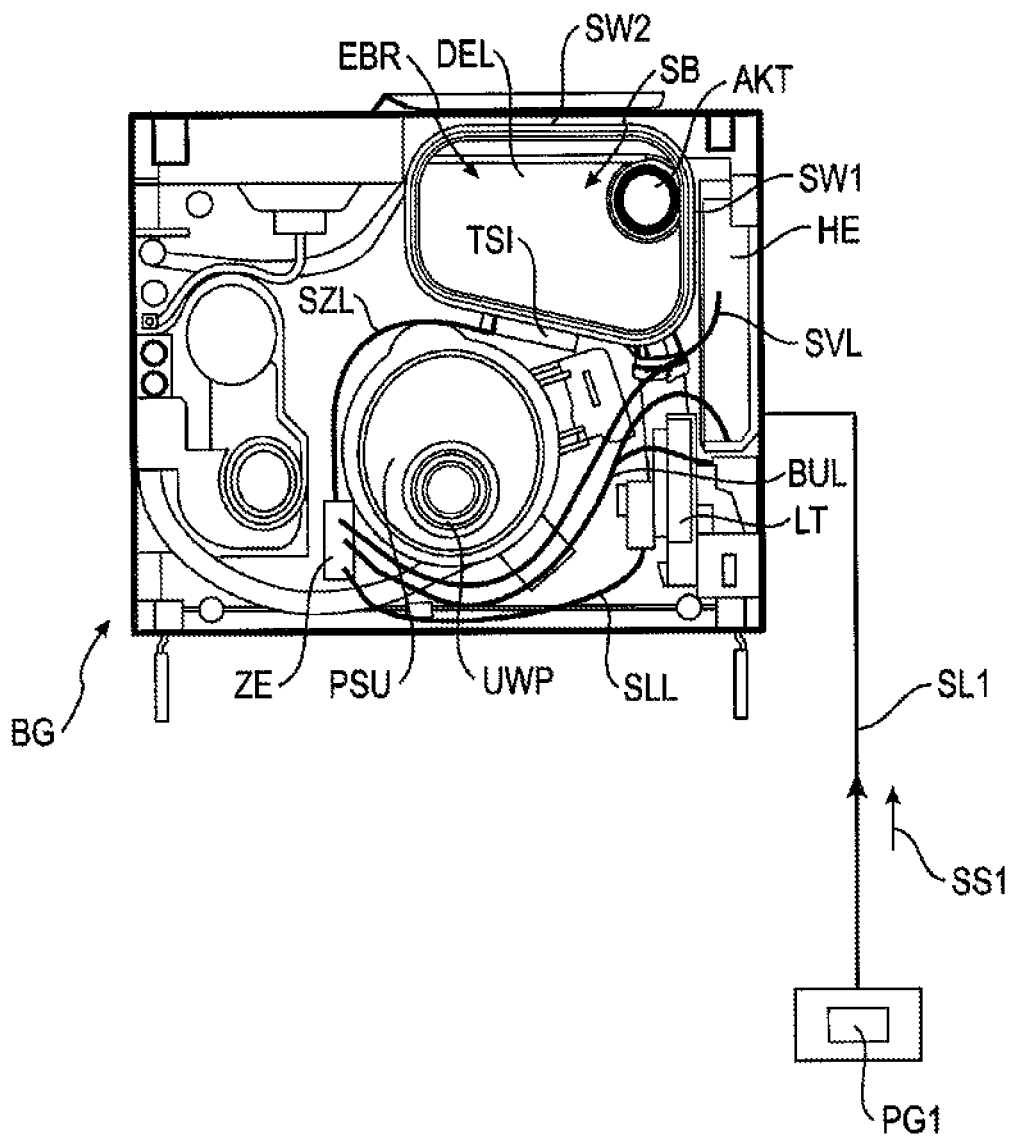
FIG. 16 shows in schematic plan representation, viewed from above, the base module of the dishwasher from FIG. 1 and FIG. 2.

FIG. 16 shows in schematic plan view representation the base module BG. It comprises in addition to the fan unit LT, the sorption container SB, the circulating pump UWP, etc. . . . a main control device HE for the control and monitoring thereof. The heating device HZ of the sorption container SB is also regulated for the desorption process thereof by means of at least one control device. This control device is formed in the exemplary embodiment here by an additional control device ZE. It serves to interrupt or switch through the power supply line SZL to the heating device HZ as required. The additional control device ZE is controlled from the main control device HE via a bus line BUL. A power supply line SVL runs from the main control device HE to the additional control device ZE. This additional control device also controls via a control line SLL the fan unit LT. The power supply line to the fan unit LT can in particular also be integrated into the control line SLL.

Also connected to the main control device HE via a signal line is at least one temperature sensor TSE (see FIG. 2) which delivers corresponding measurement signals for the temperature in the interior of the washing container to the main control device. The temperature sensor TSE is suspended between stiffening ribs VR (see FIG. 3) in the intermediate space between the two arms of the inlet-end tube portion RA1 of the air-guiding channel LK. It is thereby brought into contact with the side wall SW of the washing container SPB.

As soon as a cleaning cycle is now started, the main control device HE simultaneously switches on the additional control device ZE via the bus line BUL such that an electrical voltage is applied via the power supply line SZL to the pole pins AP1, AP2 of the heating device HZ if a desorption process is desired. As soon as a certain predetermined critical upper temperature limit has been reached during the desorption process in the interior of the washing container SPB, which the main control device HE can determine e.g. via the measurement signals of the temperature sensor, it can give the instruction to the additional control device ZE via the bus line BUL to withdraw the voltage on the power supply line SZL and thereby to switch off the heating device HZ completely. In this way, e.g. the desorption process for the sorption material in the sorption container can be terminated.

It can optionally be useful to provide for a person operating the dishwasher the option of activating or deactivating the sorption drying system TS through activation or deactivation of a specially provided program button or through corresponding selection of a program menu. This is illustrated schematically in FIG. 16 in that included in the drawing is a program button or a program menu item PG1 which gives appropriate activation or deactivation signals for switching on and switching off the sorption drying system TE via a control line SL1 by means of control signals SS1 to the control logic HE.

In particular, a first selection button for selecting an "Energy" or "Sorption operation" program variant can be provided in the control panel. In this program, the emphasis is on saving energy. This is achieved in that during the rinse cycle no heating at all is carried out by means of a continuous-flow heater and the drying of the washed items, in particular of the crockery, is effected solely with the aid of the sorption drying system TS.

It can be useful in particular, in addition to pure sorption drying, to heat the interior of the washing container during the rinse cycle through heated final rinse liquid. It can advantageously be sufficient if the transfer of heat to the items to be dried which is effected by means of the final rinse cycle is achieved with lower use of energy than is the case with no sorption drying. For electrical heat energy can, through sorption of air humidity, be saved by means of the sorption drying system now used. Thus, improved drying of wet and moist items to be washed can be achieved both by means of so-called "intrinsic-heat drying" and also by means of sorption drying, i.e. through a combination or addition of the two drying types.

In addition to or independently of the "Energy" button, a further "Drying performance" button can be provided in the control panel of the dishwasher which increases the blower run time of the fan unit. Improved drying of all crockery items can be achieved by this means.

In addition to or independently of the above special buttons, a further "Program run time" button can be provided. If the sorption drying system is switched on, the program run time can be reduced compared with conventional drying systems (without sorption drying). The run time during cleaning can optionally be further shortened through additional heating in the cleaning phase and optionally by increasing the spray pressure by increasing the motor speed of the circulating pump. Furthermore, the drying time can also be further shortened by increasing the rinse temperature.

In addition to or independently of the previous specific buttons, an actuation button with the function "Influence the cleaning performance" button can be provided. By actuating this button, the cleaning performance can be enhanced over the same run time without energy consumption being increased compared to a dishwasher without a sorption drying system. For heat energy for heating a desired total quantity of liquid in the wash tank can be saved in that, during a prewash and/or cleaning cycle, the desorption process is started at the same time and hot air, laden with a quantity of water discharged by the sorption material, passes into the washing container as a result.

What is claimed is:

1. A dishwasher, comprising:
a washing container;
an air-guiding channel to generate an air flow;
a sorption drying system to dry items to be washed, wherein the sorption drying system has a sorption container with reversibly dehydratable sorption material, the sorption container connected to the washing container by the air-guiding channel; and a heater disposed in the sorption container and arranged upstream of the reversibly dehydratable sorption material for desorption of the reversibly dehydratable sorption material;

wherein the air-guiding channel includes an inlet connecting piece connected to the sorption container and which diverts incoming air flow from an inflow direction by between 45° to 135° into a through-flow direction through the heater and the reversibly dehydratable sorption material, wherein the through-flow direction through the heater and through the reversibly dehydratable sorption material is the same direction, such that the through-flow direction runs from a bottom portion to a top portion of the sorption container, and wherein the sorption container includes a through-flow cross-sectional area for the reversibly dehydratable sorption material of substantially between 80 cm$^2$ and 800 cm$^2$.

2. The dishwasher of claim 1, wherein the dishwasher is a household dishwasher, and wherein the through-flow cross-sectional area is between 150 cm$^2$ and 500 cm$^2$.

3. The dishwasher of claim 1, wherein the reversibly dehydratable sorption material contains at least one of aluminum and silicon-oxide, and wherein the reversibly dehydratable sorption material is at least one of silica gel and zeolite.

4. The dishwasher of claim 3, wherein the zeolite is of at least one of type A, X, and Y.

5. The dishwasher of claim 1, wherein the reversibly dehydratable sorption material in the sorption container is one of a granular solid and a granulate having a plurality of particles as a fill with a grain size substantially between 1 mm and 6 mm; and wherein a fill height of the plurality of particles is at least 5 times the grain size of the plurality of particles.

6. The dishwasher of claim 5, wherein the grain size is between 2.4 mm and 4.8 mm.

7. The dishwasher of claim 1, wherein, in a direction of gravity, the reversibly dehydratable sorption material in the sorption container is one of a granular solid and a granulate with a fill height of substantially 5 times to 40 times a particle size of the one of the granular solid and the granulate.

8. The dishwasher of claim 7, wherein the fill height of the reversibly dehydratable sorption material is substantially 10 times to 15 times the particle size.

9. The dishwasher of claim 5, wherein the fill height of the reversibly dehydratable sorption material is substantially between 1.5 cm and 25 cm.

10. The dishwasher of claim 9, wherein the fill height of the reversibly dehydratable sorption material is substantially between 2 cm and 8 cm.

11. The dishwasher of claim 10, wherein the fill height of the reversibly dehydratable sorption material is substantially between 4 cm and 6 cm.

12. The dishwasher of claim 5, wherein the one of the granular solid and the granulate has a plurality of substantially spherical particles.

13. The dishwasher of claim 1, wherein the reversibly dehydratable sorption material in the sorption container absorbs a water amount of substantially between 150 ml and 400 ml.

14. The dishwasher of claim 13, wherein the water amount is substantially between 200 ml and 300 ml.

15. The dishwasher of claim 1, wherein, in the sorption container, the reversibly dehydratable sorption material absorbs a first moisture quantity transported in the air flow in a quantity by weight such that the first moisture quantity absorbed by the reversibly dehydratable sorption material is lower than a second moisture quantity applied to the items to be washed.

16. The dishwasher of claim 15, wherein the second moisture quantity is applied in a final rinsing step.

17. The dishwasher of claim 1, wherein, in the sorption container, the reversibly dehydratable sorption material has a quantity by weight sufficient to absorb a moisture quantity which corresponds substantially to a wetting quantity with which the items to be washed are wetted after the end of a final rinsing step.

18. The dishwasher of claim 1, wherein a water quantity absorbed by the reversibly dehydratable sorption material corresponds to between 4% and 25% of a liquid quantity applied to the items to be washed.

19. The dishwasher of claim 18, wherein the water quantity corresponds to between 5% and 15% of the liquid quantity.

20. The dishwasher of claim 1, wherein the reversibly dehydratable sorption material accommodated in the sorption container has an amount by weight of substantially between 0.2 kg and 5 kg.

21. The dishwasher of claim 20, wherein the amount by weight of the reversibly dehydratable sorption material is substantially between 0.3 kg and 3 kg.

22. The dishwasher of claim 21, wherein the amount by weight of the reversibly dehydratable sorption material is substantially between 0.5 kg and 2.5 kg.

23. The dishwasher of claim 1, wherein the reversibly dehydratable sorption material has pores of substantially between 1 Angstroms and 12 Angstroms in size.

24. The dishwasher of claim 23, wherein the reversibly dehydratable sorption material has pores of substantially between 2 Angstroms and 10 Angstroms size.

25. The dishwasher of claim 24, wherein the reversibly dehydratable sorption material has pores of substantially between 3 Angstroms and 8 Angstroms in size.

26. The dishwasher of claim 1, wherein the reversibly dehydratable sorption material has a water absorption capacity of substantially between 15% and 40% of a dry weight of the reversibly dehydratable sorption material.

27. The dishwasher of claim 26, wherein the water absorption capacity is substantially between 20% and 30% of the dry weight of the reversibly dehydratable sorption material.

28. The dishwasher of claim 1, wherein the reversibly dehydratable sorption material is desorbed at a temperature substantially in the range between 80° C. and 450° C.

29. The dishwasher of claim 28, wherein the range is between 220° C. and 250° C.

30. A dishwasher, comprising:
a washing container;
an air-guiding channel to generate an air flow;
a sorption drying system to dry items to be washed, wherein the sorption drying system has a sorption container with reversibly dehydratable sorption material, the sorption container connected to the washing container by the air-guiding channel; and
a heater disposed in the sorption container and arranged upstream of the reversibly dehydratable sorption material for desorption of the reversibly dehydratable sorption material;
wherein the air-guiding channel includes an inlet connecting piece connected to the sorption container and which diverts incoming air flow from an inflow direction by between 45° to 135° into a through-flow direction through the heater and the reversibly dehydratable sorption material, wherein the through-flow direction through the heater and through the reversibly dehydratable sorption material is the same direction, such that the through-flow direction runs from a bottom portion to a top portion of the sorption container, and wherein the sorption container includes a through-flow cross-sectional area for the reversibly dehydratable sorption material of substantially between 80 cm² and 800 cm²; and a flow-influencing element, wherein at least one of the air-guiding channel, the sorption container, and the flow-influencing element is embodied such that the air flow is effected through the reversibly dehydratable sorption material with a volume flow of substantially between 2 l/sec and 15 l/sec for at least one of sorption and desorption of the reversibly dehydratable sorption material.

31. The dishwasher of claim 30, wherein the volume flow is between 4 l/sec and 7 l/sec.

32. The dishwasher of claim 1, wherein the heater generates an equivalent heat output of between 250 W and 2500 W to heat the reversibly dehydratable sorption material for desorption of the reversibly dehydratable sorption material.

33. The dishwasher of claim 32, wherein the equivalent heat output is between 1000 W and 1800 W.

34. The dishwasher of claim 33, wherein the equivalent heat output is between 1200 W and 1500 W.

35. A dishwasher, comprising:
a washing container;
an air-guiding channel to generate an air flow;
a sorption drying system to dry items to be washed, wherein the sorption drying system has a sorption container with reversibly dehydratable sorption material, the sorption container connected to the washing container by the air-guiding channel; and
a heater disposed in the sorption container and arranged upstream of the reversibly dehydratable sorption material for desorption of the reversibly dehydratable sorption material;
wherein the air-guiding channel includes an inlet connecting piece connected to the sorption container and which diverts incoming air flow from an inflow direction by between 45° to 135° into a through-flow direction through the heater and the reversibly dehydratable sorption material,
wherein the through-flow direction through the heater and through the reversibly dehydratable sorption material is the same direction, such that the through-flow direction runs from a bottom portion to a top portion of the sorption container,
wherein the sorption container includes a through-flow cross-sectional area for the reversibly dehydratable sorption material of substantially between 80 cm² and 800 cm², and
wherein a ratio of a heat output of the heater and an air volume flow of the air flow which flows through the reversibly dehydratable sorption material is between 100 W sec/l and 1250 W sec/l.

36. The dishwasher of claim 35, wherein the ratio is between 100 W sec/l and 450 W sec/l.

37. The dishwasher of claim 36, wherein the ratio is between 200 W sec/l and 230 W sec/l.

38. The dishwasher of claim 1, wherein the reversibly dehydratable sorption material is embodied as one of a granular solid or granulate with an average fill density of at least 500 kg/m³.

39. The dishwasher of claim 38, wherein the average fill density of the reversibly dehydratable sorption material is substantially between 500 kg/m³ and 800 kg/m³.

40. The dishwasher of claim 39, wherein the average fill density of the reversibly dehydratable sorption material is substantially between 600 kg/m³ and 700 kg/m³.

41. The dishwasher of claim 40, wherein the average fill density of the reversibly dehydratable sorption material is substantially between 630 kg/m³ and 650 kg/m³.

42. The dishwasher of claim 41, wherein the average fill density of the reversibly dehydratable sorption material is approximately 640 kg/m³.

43. The dishwasher of claim 1, wherein the sorption container has a sorption unit, and wherein a fill height of the reversibly dehydratable sorption material is substantially constant across an inlet cross-sectional area of the sorption unit.

44. The dishwasher of claim 1, further comprising a base module, wherein the washing container has a base, wherein the base module is arranged underneath the base of the washing container, and wherein the sorption container is arranged in the base module.

45. The dishwasher of claim 1, wherein the air-guiding channel is arranged substantially outside the washing container.

46. The dishwasher of claim 1, further comprising a fan; wherein the sorption container has an entry opening; and wherein, when viewed in a flow direction, the fan is inserted upstream of the sorption container into the inlet connecting piece of the air-guiding channel to generate a forced air flow in the direction towards the entry opening of the sorption container.

47. The dishwasher of claim 46, further comprising a base module underneath the washing container, wherein the fan is arranged in the base module.

48. The dishwasher of claim 1, wherein the sorption container has a base, wherein the air-guiding channel is coupled to the sorption container such that the air flow flows into an area of the sorption container close to the base with the inflow direction and changes into the through-flow direction, which is different from the inflow direction and with which the air flow flows through the interior of the sorption container.

49. The dishwasher of claim 1, wherein the inflow direction is diverted by approximately 90°.

50. The dishwasher of claim 1, wherein the sorption container has an inlet opening; wherein the reversibly dehydratable sorption material in the interior of the sorption container has a through-flow cross-sectional area; wherein the inlet connecting piece has a passage cross-sectional area with which the air-guiding channel opens into the inlet opening of the sorption container; and wherein the through-flow cross-sectional area for the reversibly dehydratable sorption material is greater than the passage cross-sectional area of the inlet connecting piece of the air-guiding channel.

51. The dishwasher of claim 50, wherein the through-flow cross-sectional area of the sorption container is between 2 times and 40 times greater than the passage cross-sectional area of the inlet connecting piece.

52. The dishwasher of claim 51, wherein the through-flow cross-sectional area of the sorption container is between 4 times and 30 times greater than the passage cross-sectional area of the inlet connecting piece.

53. The dishwasher of claim 52, wherein the through-flow cross-sectional area of the sorption container is between 5 times and 25 times greater than the passage cross-sectional area of the inlet connecting piece.

54. The dishwasher of claim 1, wherein the sorption container accommodates a sorption unit having the reversibly dehydratable sorption material such that air flows through the reversibly dehydratable sorption material substantially in or against the direction of gravity, and wherein the air is guided out of the washing container into the sorption container via the air-guiding channel.

55. The dishwasher of claim 54, wherein the sorption unit has one of a lower sieve element and a lower grid element and one of an upper sieve element and an upper grid element at a predefined vertical distance from one another, and wherein a spatial volume between the one of the two sieve elements and the two grid elements is substantially completely filled with the reversibly dehydratable sorption material.

56. The dishwasher of claim 1, wherein, when viewed against the direction of gravity, the sorption container has a layer having the heater, an intermediate space downstream from the heater, and a subsequent sorption unit.

57. The dishwasher of claim 1, wherein the sorption container has a base, and wherein the heater is arranged in a lower cavity close to the base of the sorption container.

58. The dishwasher of claim 1, wherein a flow-conditioning element is arranged in at least one of the sorption container and the inlet connecting piece of the air-guiding channel such that equalization of a local flow cross-sectional profile of the air flow is effected when flowing through the sorption container in the through-flow direction of the sorption container.

59. The dishwasher of claim 1, wherein the sorption container has an inlet and an outlet, and a lower cavity and an upper cavity defined by interior surfaces of the sorption container,
wherein the reversibly dehydratable sorption material is disposed in the upper cavity and fills a spatial volume of the upper cavity, the sorption container being connected to the washing container by the air-guiding channel and guiding the air flow into the inlet, through the lower cavity and into the upper cavity where the air flow flows through the reversibly dehydratable sorption material before exiting the outlet to the washing container,
wherein the upper cavity of the sorption container defines the through-flow cross-sectional area for the reversibly dehydratable sorption material of substantially between 80 cm$^2$ and 800 cm$^2$, and
wherein the lower cavity of the sorption container defines an initial through-flow cross-sectional area that is less than the through-flow cross-sectional area of the upper cavity.

60. A dishwasher, comprising:
a washing container;
an air-guiding channel to generate an air flow;
a sorption drying system to dry items to be washed, wherein the sorption drying system has a sorption container with reversibly dehydratable sorption material, the sorption container connected to the washing container by the air-guiding channel; and
a heater disposed in the sorption container and arranged upstream of the reversibly dehydratable sorption material for desorption of the reversibly dehydratable sorption material;
wherein the air-guiding channel includes an inlet connecting piece connected to the sorption container and which diverts incoming air flow from an inflow direction by between 45° to 135° into a through-flow direction through the heater and the reversibly dehydratable sorption material,
wherein the through-flow direction through the heater and through the reversibly dehydratable sorption material is the same direction, such that the through-flow direction runs from a bottom portion to a top portion of the sorption container,
wherein the sorption container includes a through-flow cross-sectional area for the reversibly dehydratable sorption material of substantially between 80 cm$^2$ and 800 cm$^2$, and
wherein the through-flow cross-sectional area of the sorption container is between 2 times and 40 times greater than a passage cross-sectional area of the inlet connecting piece.

61. The dishwasher of claim 60, further comprising:
a fan in communication with the air-guiding channel to generate the air flow in a direction of the sorption drying system,
wherein sorption container has an inlet and an outlet, and a lower cavity and an upper cavity defined by interior surfaces of the sorption container, the reversibly dehydratable sorption material is in the upper cavity of the sorption container and fills a spatial volume of the upper cavity,
the sorption container guiding the air flow into the inlet, through the lower cavity and into the upper cavity where the air flow flows through the reversibly dehydratable sorption material before exiting the outlet to the washing container,
wherein the upper cavity of the sorption container defines a through-flow cross-sectional area for the reversibly dehydratable sorption material of substantially between 80 cm$^2$ and 800 cm$^2$,
wherein the lower cavity of the sorption container defines a through-flow cross-sectional area that is less than the upper cavity,
wherein the reversibly dehydratable sorption material in the sorption container includes a plurality of particles with a grain size substantially between 1 mm and 6 mm,
wherein the fill height of the reversibly dehydratable sorption material is substantially between 1.5 cm and 25 cm,
wherein the sorption container has an inlet opening and the inlet connecting piece has a passage cross-sectional area with which the air-guiding channel opens into the inlet opening of the sorption container, and wherein the through-flow cross-sectional area for the reversibly dehydratable sorption material is greater than the passage cross-sectional area of the inlet connecting piece of the air-guiding channel.

62. The dishwasher of claim 61, wherein the washing container includes a base, and wherein the sorption container is suspended underneath the base of the washing container.

* * * * *